US009756999B2

(12) United States Patent
Vines

(10) Patent No.: US 9,756,999 B2
(45) Date of Patent: Sep. 12, 2017

(54) VACUUM CLEANER FILTRATION SYSTEM WITH FILTER CLEANING MODE

(71) Applicant: Aktiebolaget Electrolux, Stockholm (SE)

(72) Inventor: Brian Vines, Stockholm (SE)

(73) Assignee: Aktiebolaget Electrolux (SE)

( * ) Notice: Subject to any disclaimer, the term of this patent is extended or adjusted under 35 U.S.C. 154(b) by 14 days.

(21) Appl. No.: 14/579,219

(22) Filed: Dec. 22, 2014

(65) Prior Publication Data

US 2016/0174803 A1    Jun. 23, 2016

(51) Int. Cl.
| | | |
|---|---|---|
| A47L 9/20 | (2006.01) |
| A47L 9/12 | (2006.01) |
| B01D 45/16 | (2006.01) |
| B01D 46/00 | (2006.01) |
| B01D 50/00 | (2006.01) |

(Continued)

(52) U.S. Cl.
CPC ........ *A47L 9/20* (2013.01); *A47L 5/28* (2013.01); *A47L 9/127* (2013.01); *A47L 9/16* (2013.01); *B01D 45/16* (2013.01); *B01D 46/0019* (2013.01); *B01D 46/0058* (2013.01);
(Continued)

(58) Field of Classification Search
CPC . A47L 9/20; A47L 9/122; A47L 9/127; A47L 9/1472; A47L 9/1666; A47L 9/1683; A47L 9/108
USPC .... 15/347, 339, 319, 353; 55/283, 289, 345, 55/DIG. 3
See application file for complete search history.

(56) References Cited

U.S. PATENT DOCUMENTS 2,077,572 A    4/1937   Lofgren
2,171,248 A    8/1939   Van Berkel
(Continued)

FOREIGN PATENT DOCUMENTS

CN    1889879    1/2007
DE    1001465    1/1957
(Continued)

OTHER PUBLICATIONS

Entire patent prosecution history of U.S. Appl. No. 12/524,503, filed Apr. 26, 2010, entitled, "Vacuum Cleaner," now U.S. Pat. No. 8,881,342, issued Nov. 11, 2014.
(Continued)

*Primary Examiner* — Jacob T Minskey
*Assistant Examiner* — Minh-Chau Pham
(74) *Attorney, Agent, or Firm* — RatnerPrestia

(57) ABSTRACT

A vacuum cleaner filtration system having a primary separation system and a filter downstream of the primary separation system. The filter has an upstream side to receive an airflow exiting the primary separation system, and a downstream side fluidly opposite the upstream side. The system has a vacuum fan, a primary suction path between the filter's downstream side and the vacuum fan, a valve in the primary suction path and configured to selectively position to block the primary suction path and create a closed passage at the filter's downstream side, and a secondary suction path between the filter's upstream side and the vacuum fan. A secondary filtration system is in the secondary suction path to separate dirt from an airflow passing therethrough, to thereby clean dirt from the filter's upstream side. A nozzle may be provided to concentrate the air flow as it enters the secondary suction path.

33 Claims, 14 Drawing Sheets

(51) Int. Cl.
  *B01D 46/44* (2006.01)
  *A47L 5/28* (2006.01)
  *A47L 9/16* (2006.01)
(52) U.S. Cl.
  CPC ....... *B01D 46/0068* (2013.01); *B01D 46/446* (2013.01); *B01D 50/002* (2013.01)

(56) References Cited

U.S. PATENT DOCUMENTS

| | | | |
|---|---|---|---|
| 2,404,358 A | 7/1946 | Bible |
| 2,405,129 A | 8/1946 | Bible |
| 2,543,342 A | 2/1951 | Timm |
| 3,089,177 A | 5/1963 | Andersson-Sason |
| 3,653,189 A | 4/1972 | Miyake |
| 4,199,334 A | 4/1980 | Berkhoel |
| 4,210,427 A | 7/1980 | Brett |
| 4,504,293 A | 3/1985 | Gillingham |
| 4,719,662 A | 1/1988 | Horak |
| 4,823,731 A | 4/1989 | Howeth |
| 4,838,902 A | 6/1989 | Lomax |
| 4,868,949 A | 9/1989 | Loveless |
| 5,066,315 A | 11/1991 | Haberl |
| 5,090,083 A | 2/1992 | Wulff |
| 5,217,512 A | 6/1993 | Williams |
| 5,271,751 A | 12/1993 | Lagler |
| 5,281,246 A | 1/1994 | Ray |
| 5,603,740 A | 2/1997 | Roy |
| 5,690,710 A | 11/1997 | Stephan |
| 5,704,956 A | 1/1998 | Loveless |
| 5,930,994 A | 8/1999 | Shimato |
| 5,951,746 A | 9/1999 | Treitz |
| 5,961,675 A | 10/1999 | Son |
| 6,085,382 A | 7/2000 | Bobrosky |
| 6,458,178 B1 | 10/2002 | Dietz |
| 6,569,218 B2 | 5/2003 | Dudley |
| 6,598,263 B2 | 7/2003 | Boles |
| 6,601,265 B1 | 8/2003 | Burlington |
| 6,625,845 B2* | 9/2003 | Matsumoto ............. A47L 9/108 |
| | | | 15/352 |
| 6,681,412 B2 | 1/2004 | Doss |
| 6,733,574 B2 | 5/2004 | Gubler |
| 6,758,874 B1 | 7/2004 | Hunter, Jr. |
| 6,811,584 B2 | 11/2004 | Oh |
| 6,824,580 B2 | 11/2004 | Oh |
| 6,829,804 B2 | 12/2004 | Sepke |
| 6,830,599 B1 | 12/2004 | McCutchen |
| 6,928,692 B2 | 8/2005 | Oh |
| 7,070,636 B2 | 7/2006 | McCormick |
| 7,074,248 B2 | 7/2006 | Jin |
| 7,082,640 B2 | 8/2006 | McCutchen |
| 7,152,276 B2 | 12/2006 | Jin |
| 7,152,277 B2 | 12/2006 | Jung |
| 7,163,568 B2 | 1/2007 | Sepke |
| 7,208,024 B2 | 4/2007 | Weber |
| 7,228,592 B2 | 6/2007 | Hawkins |
| 7,293,326 B2 | 11/2007 | Hawkins |
| 7,351,269 B2 | 4/2008 | Yau |
| 7,377,010 B2 | 5/2008 | Harsh |
| 7,419,520 B2 | 9/2008 | Lee |
| 7,485,167 B2 | 2/2009 | Kennedy |
| 7,494,520 B2 | 2/2009 | Nam |
| 7,662,200 B2 | 2/2010 | Knuth |
| 7,673,369 B2 | 3/2010 | Gogel |
| 7,752,708 B2 | 7/2010 | Gogel |
| 7,780,752 B2 | 8/2010 | Cha |
| 7,799,103 B2 | 9/2010 | Coburn |
| 7,814,612 B2 | 10/2010 | Sepke |
| 7,845,046 B2 | 12/2010 | Milligan |
| 7,867,304 B2 | 1/2011 | Stewen |
| 7,908,707 B2 | 3/2011 | Yacobi |
| 7,945,988 B2 | 5/2011 | Gordon |
| 7,951,214 B2 | 5/2011 | Menrik |
| 7,976,614 B2 | 7/2011 | Eckstein |
| 8,032,984 B2 | 10/2011 | Rowntree |
| 8,142,554 B2 | 3/2012 | Eckstein |
| 8,186,005 B2 | 5/2012 | Stewen |
| 8,211,216 B2 | 7/2012 | Castronovo |
| 8,308,831 B2 | 11/2012 | Coburn |
| 8,393,048 B2 | 3/2013 | Rentschler |
| 8,424,154 B2 | 4/2013 | Beskow |
| 8,510,903 B2 | 8/2013 | Jubner |
| 8,516,654 B1 | 8/2013 | McCutchen |
| 8,549,704 B2 | 10/2013 | Milligan |
| 8,572,801 B2 | 11/2013 | Engstrom |
| 8,695,157 B2 | 4/2014 | Beskow |
| 8,726,460 B2 | 5/2014 | Jonsson |
| 8,881,342 B2 | 11/2014 | Jonsson |
| 2002/0194993 A1* | 12/2002 | Gen ...................... A47L 9/1625 |
| | | | 95/268 |
| 2003/0121121 A1 | 7/2003 | Nakai |
| 2003/0131571 A1 | 7/2003 | Demarco |
| 2005/0011036 A1 | 1/2005 | McCutchen |
| 2005/0120510 A1 | 6/2005 | Weber |
| 2005/0183233 A1 | 8/2005 | Lin |
| 2006/0042202 A1* | 3/2006 | Lee ........................ A47L 9/20 |
| | | | 55/289 |
| 2006/0168923 A1* | 8/2006 | Lee ........................ A47L 9/122 |
| | | | 55/345 |
| 2007/0017064 A1* | 1/2007 | Gogel ..................... A47L 9/20 |
| | | | 15/352 |
| 2007/0056136 A1 | 3/2007 | Stephens |
| 2007/0095029 A1* | 5/2007 | Min ....................... A47L 9/122 |
| | | | 55/345 |
| 2007/0125049 A1 | 6/2007 | Menrik |
| 2007/0186372 A1* | 8/2007 | Rowntree ............... A47L 9/127 |
| | | | 15/347 |
| 2007/0209339 A1 | 9/2007 | Conrad |
| 2010/0146720 A1 | 6/2010 | Fillon |
| 2010/0236016 A1* | 9/2010 | Tran ....................... A47L 9/1472 |
| | | | 15/347 |
| 2010/0306955 A1 | 12/2010 | Menrik |
| 2012/0023701 A1* | 2/2012 | Lenkiewicz .......... A47L 9/1666 |
| | | | 15/352 |
| 2012/0080057 A1 | 4/2012 | Jonsson |
| 2013/0008468 A1* | 1/2013 | Bertram ................ A47L 9/0072 |
| | | | 134/10 |
| 2014/0359966 A1* | 12/2014 | Han ....................... A47L 9/1683 |
| | | | 15/327.1 |
| 2015/0107046 A1* | 4/2015 | Hyun ..................... A47L 9/108 |
| | | | 15/347 |
| 2015/0223657 A1* | 8/2015 | Choe ..................... A47L 9/1683 |
| | | | 15/347 |
| 2016/0088988 A1* | 3/2016 | Eo ......................... A47L 9/08 |
| | | | 15/353 |
| 2016/0113463 A1* | 4/2016 | Hyun ..................... A47L 9/1625 |
| | | | 55/337 |

FOREIGN PATENT DOCUMENTS

| | | |
|---|---|---|
| DE | 4138223 | 2/1993 |
| EP | 1574160 | 9/2005 |
| EP | 1584279 | 10/2005 |
| GB | 294501 | 7/1928 |
| GB | 564138 | 9/1944 |
| JP | 04352925 | 12/1992 |
| JP | 2002028107 | 1/2002 |
| JP | 2005065770 | 3/2005 |
| KR | 20060117966 | 11/2006 |
| WO | 8502528 | 6/1985 |
| WO | 9012532 | 11/1990 |
| WO | 2004100752 | 11/2004 |
| WO | 2005053497 | 6/2005 |
| WO | 2008091204 | 7/2008 |

OTHER PUBLICATIONS

Entire patent prosecution history of U.S. Appl. No. 12/524,507, filed Apr. 27, 2010, entitled, "Vacuum Cleaner," now U.S. Pat. No. 8,726,460, issued May 20, 2014.
Entire patent prosecution history of U.S. Appl. No. 12/676,792, filed Aug. 9, 2010, entitled, "Vacuum Cleaner with Filter Cleaning," now

(56) References Cited

OTHER PUBLICATIONS

U.S. Pat. No. 8,695,157, issued Apr. 15, 2014.
Supplemental European Search Report for Application No. EP08705240 dated May 15, 2014.
Translation of Korean Office Action for Korean Application No. 1020097016069 dated Dec. 16, 2013.

* cited by examiner

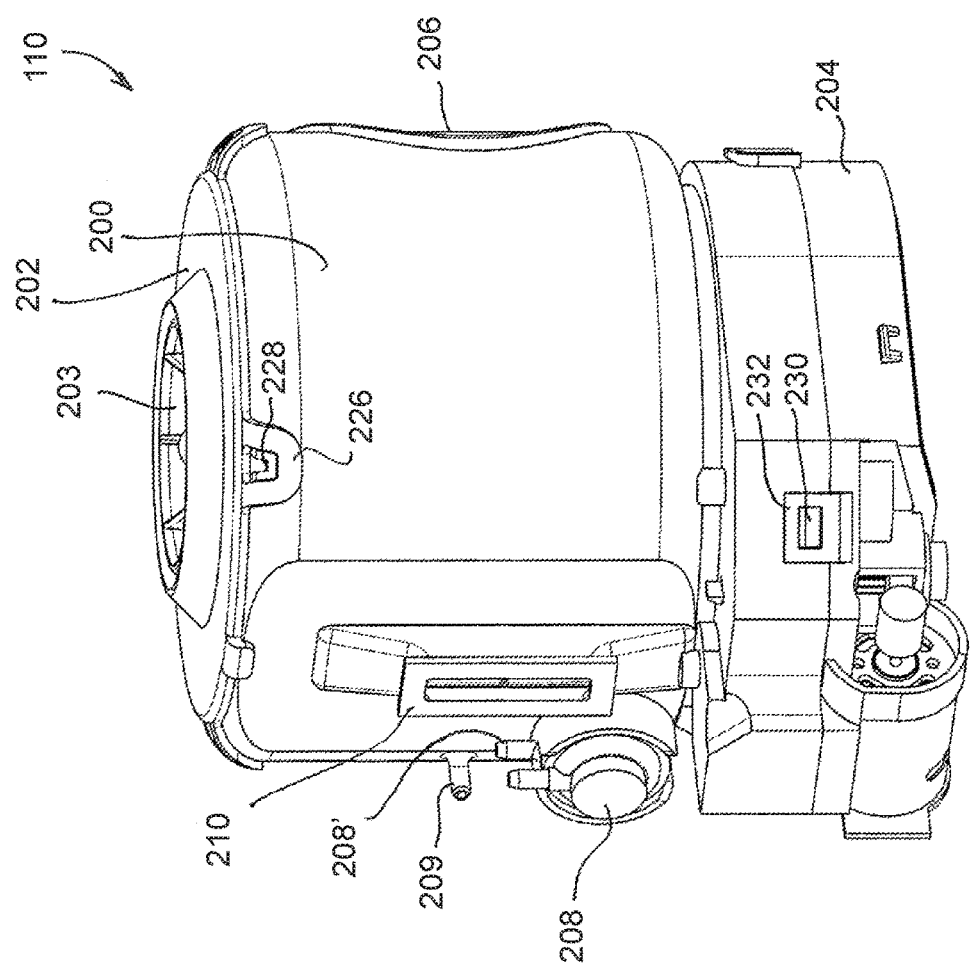

Section view A-A
Scale: 1:1

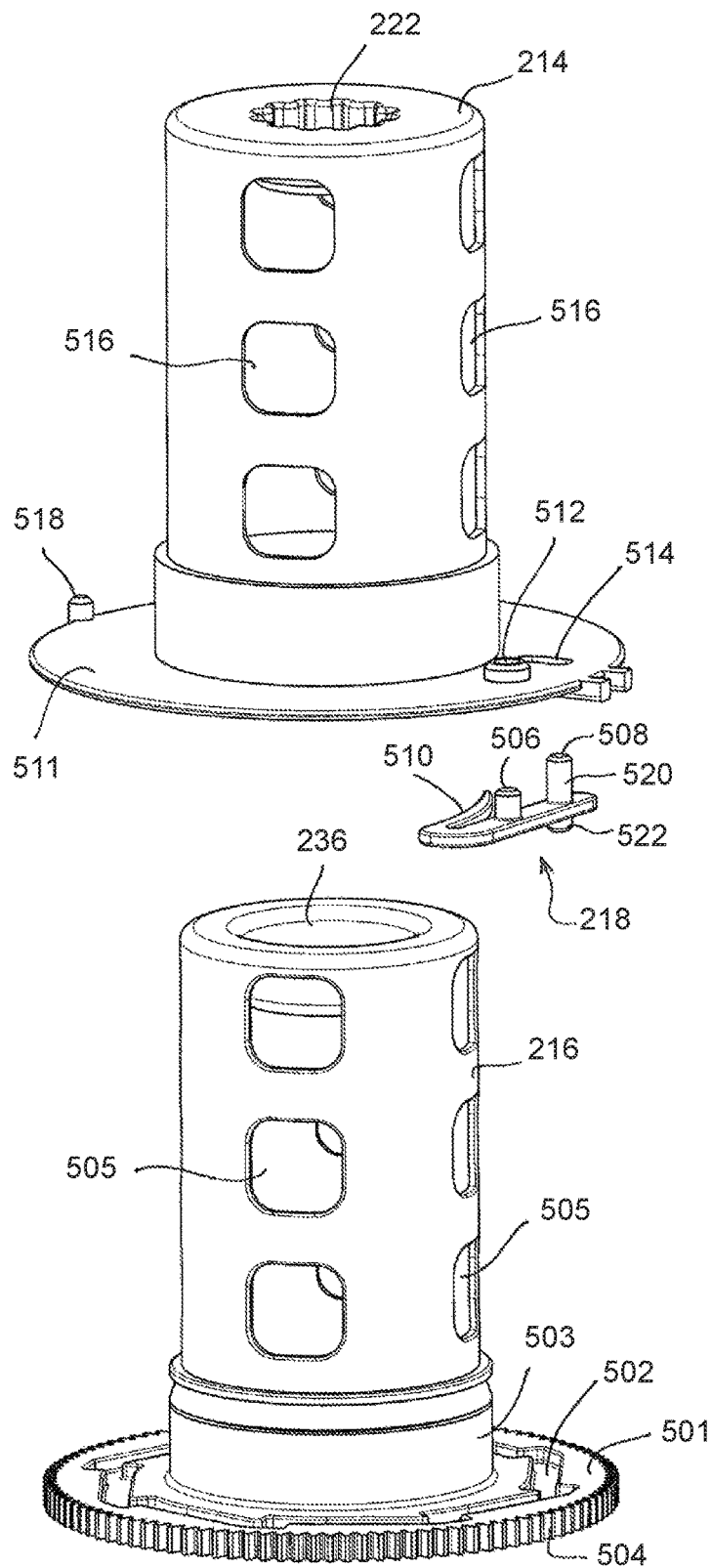

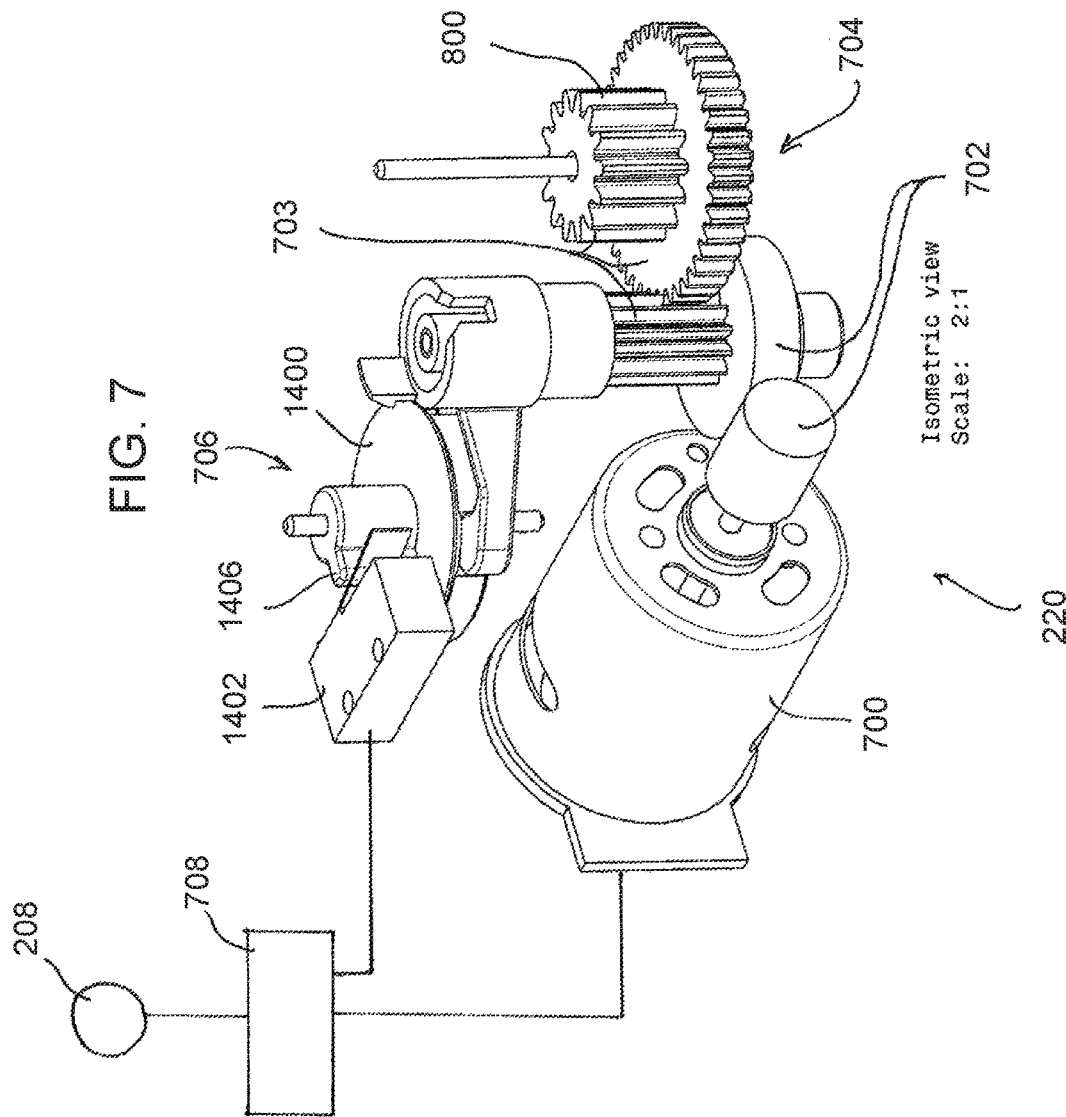

Isometric view
Scale: 1:1

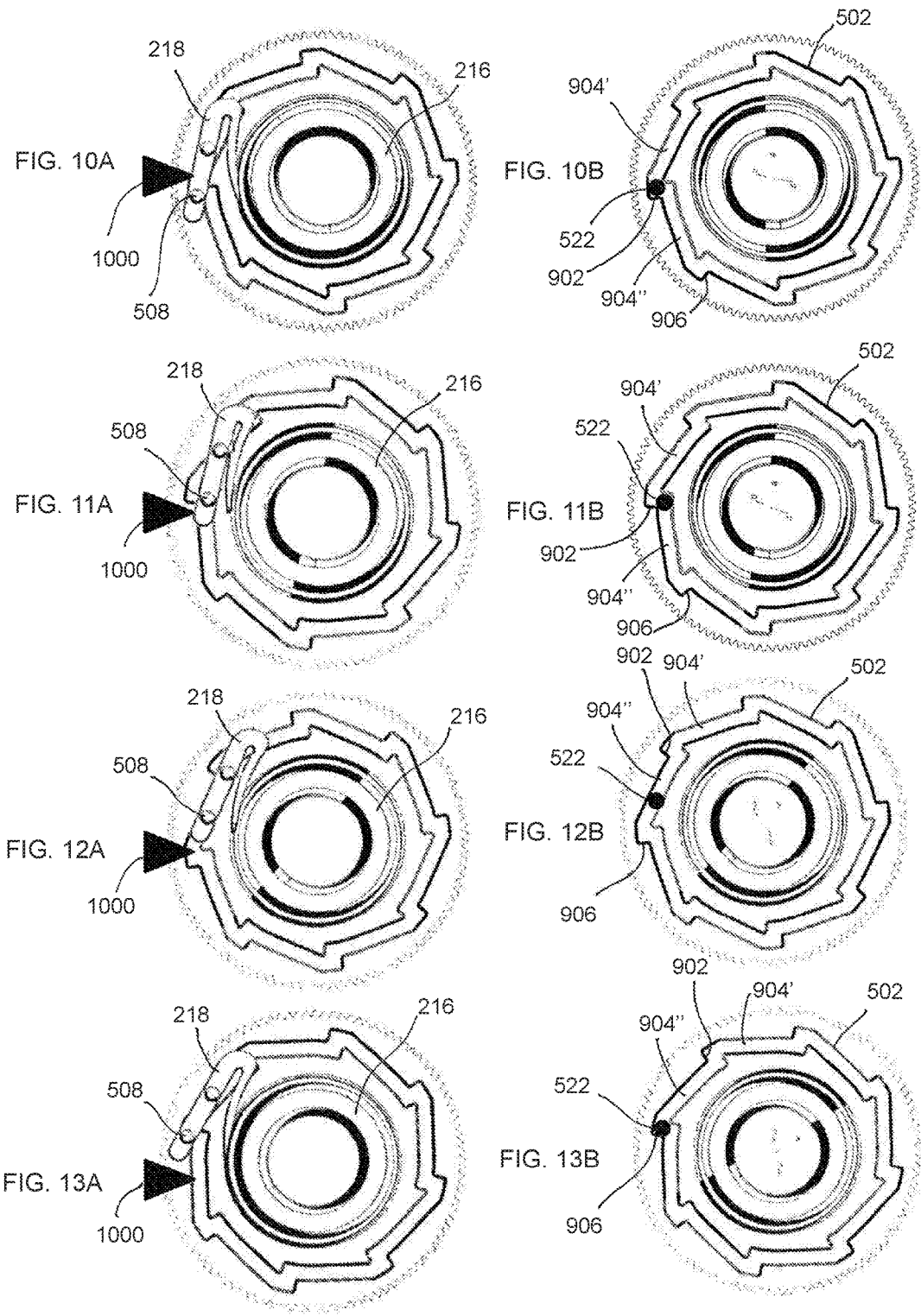

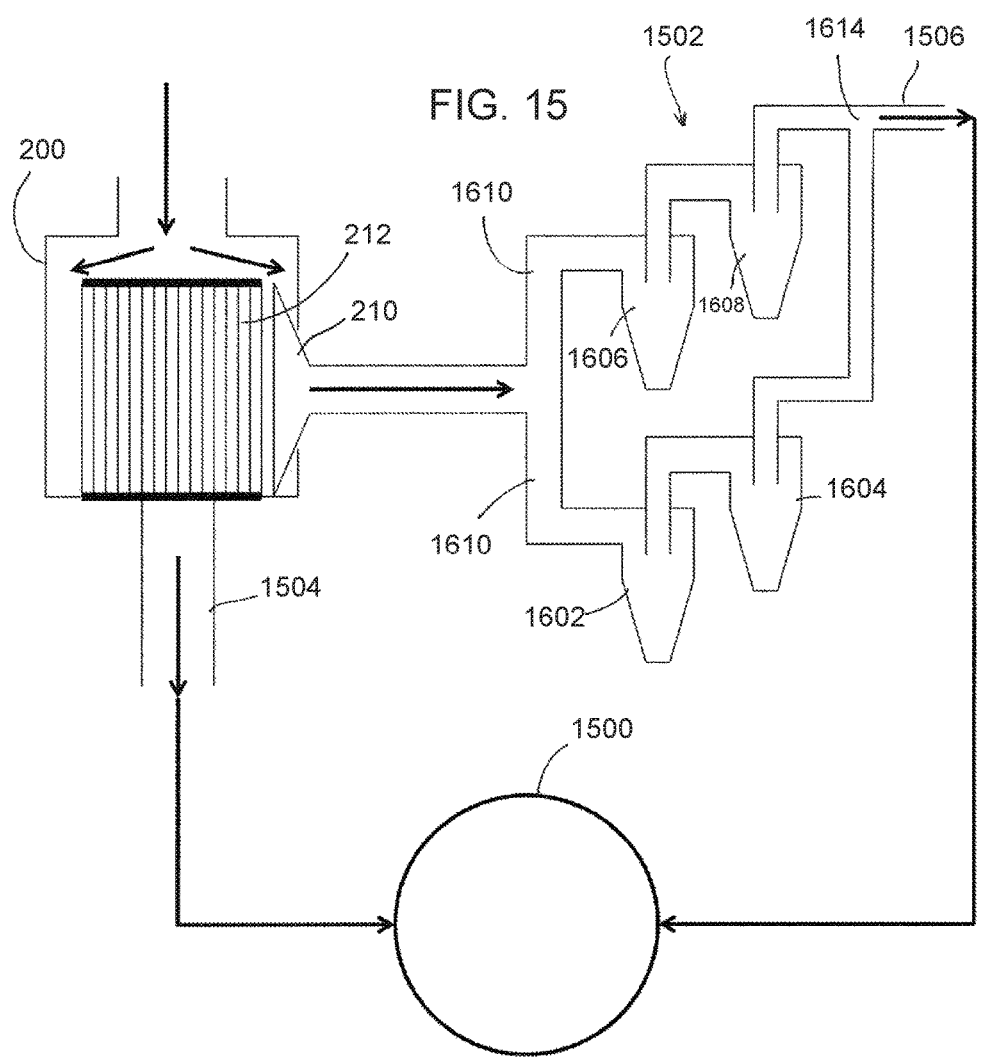

VACUUM CLEANER FILTRATION SYSTEM WITH FILTER CLEANING MODE

FIELD OF THE INVENTION

The present disclosure relates to a vacuum cleaner that has a filter cleaning mode in which the filter assembly is in fluid communication with a secondary cleaning mechanism to remove dust from the filter, and a method for cleaning a vacuum cleaner filter.

BACKGROUND

It is known in the art to provide a vacuum cleaner having a separating unit, a downstream filter, and a vacuum source for creating a negative air pressure. Such a vacuum cleaner may be configured to operate in a vacuum cleaning mode, in which the vacuum source is connected to the separating unit to force a dust laden airstream therethrough in order to separate dust from the airstream, and the downstream filter is connected between the separating unit and the vacuum source to receive the airstream in a forward direction for filtering remaining dust therefrom. The vacuum cleaner may be switchable to a filter cleaning mode, in which the vacuum source is connected to the downstream filter to force an airstream therethrough in a reverse direction in order to remove dust from the downstream filter, and the separating unit is connected between the downstream filter and the vacuum source to remove dust, released by the downstream filter, from the airstream.

An example of such a vacuum cleaner is disclosed in U.S. Pat. No. 7,951,214, which is incorporated herein by reference. In that document, two downstream filters are used, and when one is clogged by fine dust, the user may switch the places of the filters and clean the clogged filter using the separating unit and the other downstream filter. The cleaned filter is then ready for use when the other filter becomes clogged. Other prior devices use a single downstream filter, but include a series of valves to selectively reconfigure the airflow to pass in reverse through the downstream filter. Devices such as this, and similar devices, are shown in U.S. application Ser. Nos. 12/524,503; 12/676,792 and 12/524,507, which are all incorporated herein by reference.

While the foregoing devices are believed to have practical use, there still remains a need to provide alternative mechanisms and methods for cleaning vacuum cleaner filters.

SUMMARY

Aspects of the invention may be incorporated into, or used with, any kind of vacuum cleaner. Exemplary aspects are used with upright vacuum cleaners, canister vacuum cleaners, central vacuum cleaners, stick vacuum cleaners, and so on.

Aspects of the invention include a vacuum cleaner filtration system having a primary separation system and a filter located downstream of the primary separation system. The filter has an upstream side configured to receive an airflow exiting the primary separation system, and a downstream side fluidly opposite the upstream side. The system also has a vacuum fan, a primary suction path between the downstream side of the filter and the vacuum fan, a valve located in the primary suction path and configured to selectively position to block the primary suction path and create a closed passage at the downstream side of the filter, and a secondary suction path between the upstream side of the filter and the vacuum fan. A secondary filtration system is in the secondary suction path and configured to separate dirt from an airflow passing through the secondary suction path. Other variations and permutations are contemplated and described, as will be appreciated from a full reading of the contents of the drawings, specification and appended claims.

It will be appreciated that this Summary is not intended to limit the claimed invention in any way.

BRIEF DESCRIPTION OF THE DRAWINGS

A better understanding of the exemplary embodiments may be understood by reference to the attached drawings, in which like reference numbers designate like parts. The drawings are exemplary, and not intended to limit the claims in any way.

FIGS. 2A, 2B and 2C are views of a filter assembly.

FIG. 5 is an exploded view of a filter mount, filter valve, and toggle arm.

FIG. 7 depicts a gear assembly operatively connected to a counter.

FIGS. 10A-13B are top views of a filter valve and toggle arm showing the filter valve moving from an open position to a closed position.

FIG. 15 is a diagram depicting air flow paths through an exemplary embodiment of the invention.

BRIEF DESCRIPTION OF EMBODIMENTS

The exemplary embodiments described herein relate to, and are useable with, vacuum cleaners of all kinds, such as an upright vacuum cleaner (e.g., vacuum cleaner 10) or a canister vacuum cleaner. Other embodiments may be used with central, backpack, stick and other kinds of vacuum cleaner, such as those described previously herein or otherwise known in the art.

Figure 1:
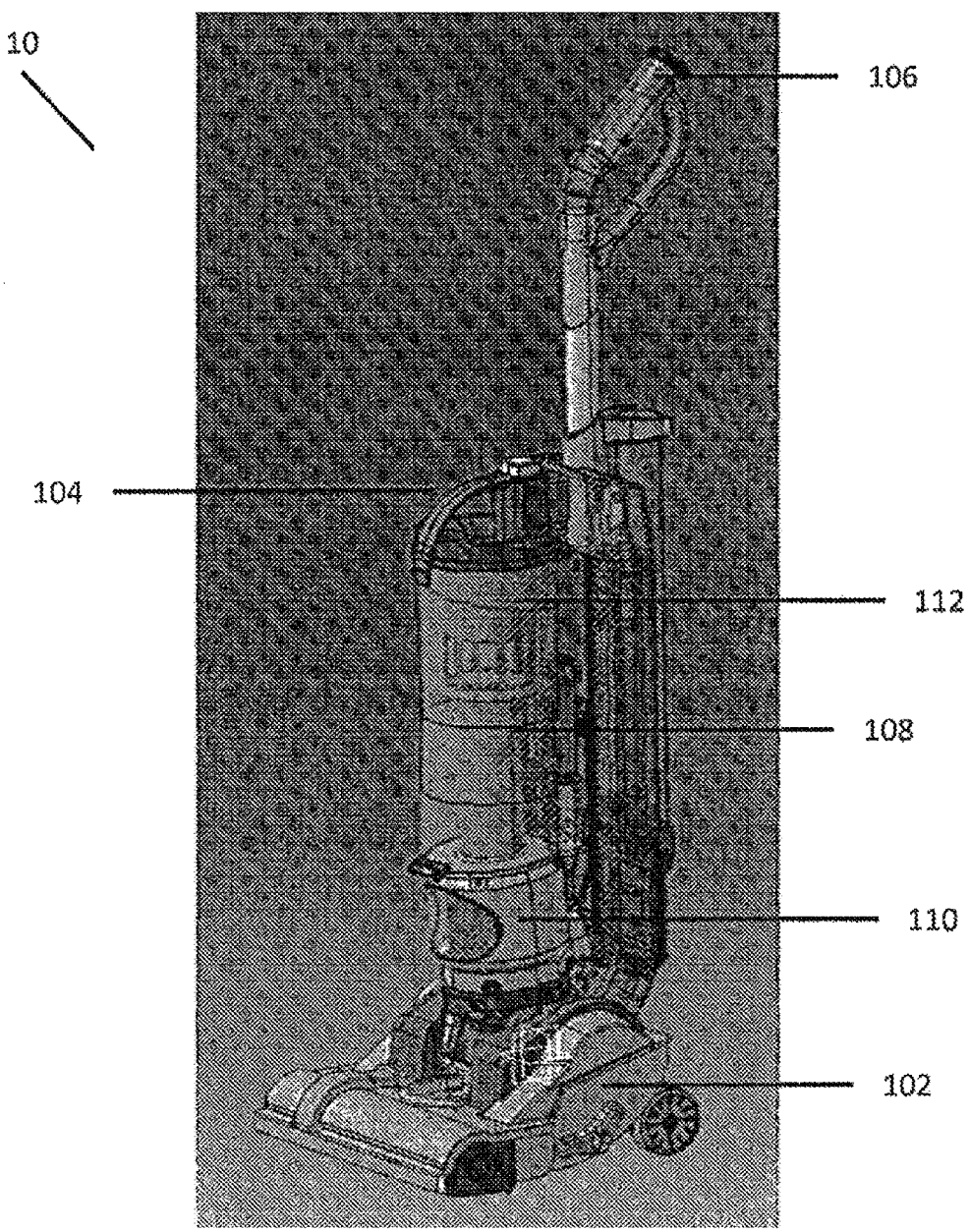
FIG. 1 depicts a vacuum cleaning according to exemplary aspects of the invention.

FIG. 1 is an upright vacuum cleaner 10 that includes a base 102 configured to move along a surface such as a floor, and an upper housing 104 that usually is pivotally mounted to the base 102 and provided with a handle 106 that is used to manipulate and maneuver the vacuum cleaner. The downward-facing surface of the base 102 includes a main suction inlet that faces the floor, and through which dirt-laden air is drawn into the device by a motor-driven vacuum fan. The vacuum fan may be located in the upper housing 104 or in the base 102. The main inlet and vacuum fan are in fluid communication by one or more ducts and flexible hoses that collectively form a flow path through the vacuum cleaner 100, as well-known in the art. The vacuum cleaner 10 also may include one or more auxiliary inlets to the flow path, such as an inlet that is provided on a flexible hose for cleaning above the floor, as known in the art. Ultimately, the air exits the flow path through an outlet to the ambient air.

Any number of filtration devices, such as bags, screens, pleated filters, foam filters, and cyclonic separators may be included in the flow path, either upstream or downstream of the vacuum fan. For example, the upright vacuum cleaner 100 may have a primary dirt separation device, such as a bag filter or cyclone chamber, located in the upper housing 104. The dirt separation device may alternatively be located in the base 102. Examples of full-size and smaller "stick" upright vacuum cleaners having these and other features are provided in U.S. Pat. Nos. 6,829,804; 7,163,568; 7,228,592; 7,293,326; 7,662,200; 7,814,612; and 8,572,801, which are incorporated herein by reference. Examples of canister vacuum cleaners are provided in U.S. Pat. Nos. 8,510,903 and 3,089,177, which are incorporated herein by reference. Inventions described herein may be used with upright, stick and canister vacuum cleaners such as provided in the foregoing examples, or in other kinds of vacuum cleaners.

The exemplary vacuum cleaner 10 shown in FIG. 1 includes a primary separation system, which may be cyclonic chamber 108, a bag filter, or the like. A typical cyclonic chamber 108 includes one or more cyclone separators arranged in series and/or parallel, and it may include a shroud 112 that prevents excessively large objects from exiting the cyclonic chamber 108. The shroud 112 may include a mesh, perforated screen, a porous filter, vanes, or other similar structures configured to block larger objects from passing through, or it may simply comprise a tubular passage that forms a central axis of a cyclonic airflow. The shroud 112 also may include one or more structures to help control airflow, such as a disk-like separator plate or the like. The foregoing and other variations of shrouds and associated structures are known in the art and need no further explanation herein.

During operation, dirty air that is collected through the suction inlet of the vacuum cleaner (e.g., at the base 102 or through an auxiliary inlet) enters the cyclonic chamber 108, and is carried through cyclonic motion to facilitate the separation of dirt from the air as is known in the art. However, not all dirt and dust are separated from the air within the cyclonic chamber 108. This "semi-clean" air that remains enters the shroud 112 and is carried further into the vacuum cleaner 10 to a filter assembly 110 located downstream of the primary separation system. The semi-clean air passes into a filter located within the filter assembly 110, to remove more of the dirt and dust from the air. After exiting the filter assembly 110, the now-cleaner air enters the vacuum fan. A post-fan filter also may be provided to further clean the air exiting the vacuum cleaner 10.

Figure 2A:
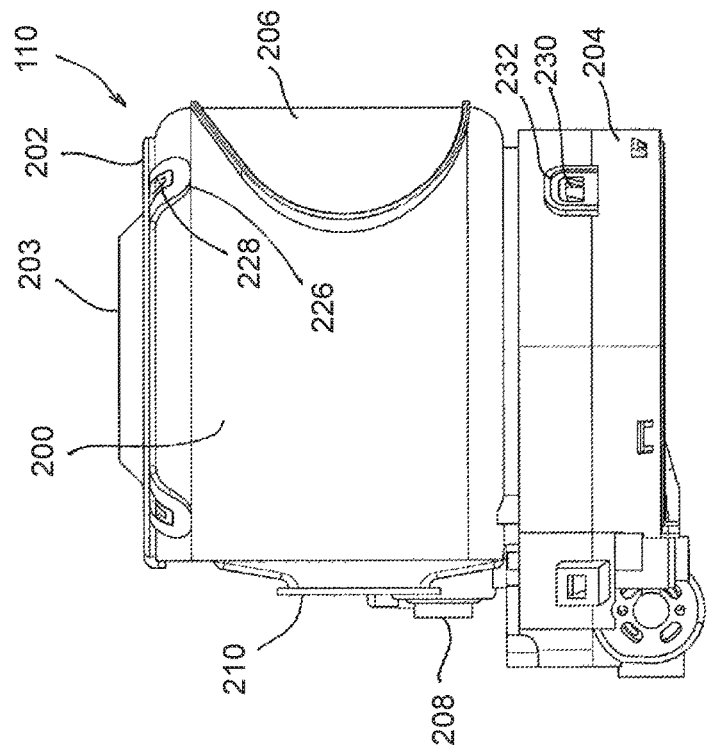
Figure 2B:
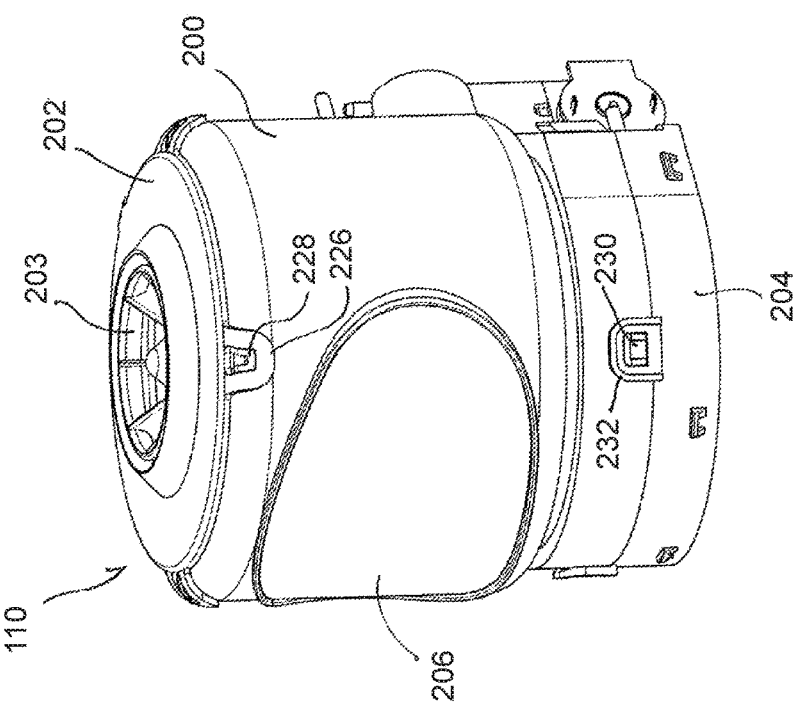
Figure 3:
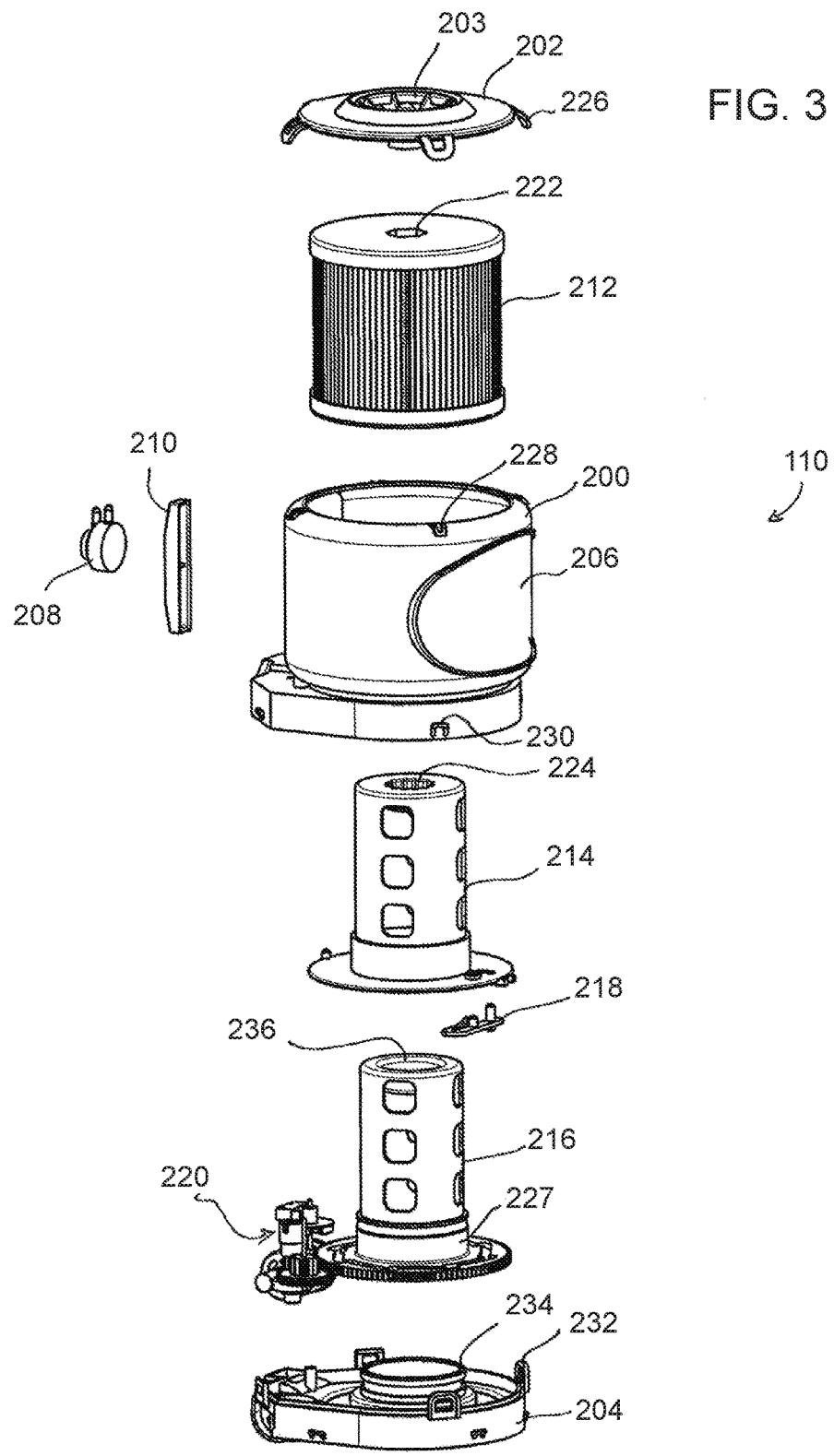
FIG. 3 is an exploded view of a filter assembly.

Referring to FIGS. 2A-3, various views of an exemplary filter assembly 110 are depicted. The filter assembly 110 includes a housing 200, a cover 202 and a base 204. The cover 202 includes a suction inlet 203 through which semi-clean air from the cyclonic chamber 108 (or other filtration device, such as a bag filter) passes for additional filtration. An airspace is provided between the suction inlet 203 and the operative surface of a filter 212 enclosed in the housing 200 to allow air to pass to the filter 212 surface. Vanes or other air directing devices may be provided to help the air move along desired paths within the housing 200. The cover 202 is mounted to the housing 200 via connectors that engage the housing 200. These connectors may be in the form of loops 226 that snap over corresponding posts 228 or other removable fasteners, friction fitments (e.g. a resilient O-ring fitted between the parts), a hinge joint, or other mechanisms as known in the art. Similarly, the base 204 is mounted to the housing 200 via connectors, such as bottom loops 232 that engage bottom posts 230 on the housing 200, or other connecting devices. The cover 202 and base 204 may be removably mounted to the housing 200, as shown, or one or both may be formed as part of the housing 104. For example, the cover 202 and base 204 may be rigidly connected to the remainder of the housing 104, and the housing 200 may be slideably inserted between the cover 202 and the base 204. The cover 202 also may be formed as the bottom of the cyclonic chamber 108. Other alternatives will be readily apparent to persons of ordinary skill in the art in view of the present disclosure.

As noted above, the filter assembly 110 includes a filter 212 contained within the housing 200. The filter 212 is located between the cover 202 and the base 204, and a transparent window 206 may be provided on the housing 200 to view the filter 212. The filter 212 may comprise a pleated sheet of filtration media, a band of foam filter material, or other filtration media or combinations of filtration media, as known in the art. The filter 212 may be generally cylindrical, although other suitable shapes (e.g., conical or frustroconical) will be understood by one of skill in the art from the description herein. A mounting indent 222 is formed on the top of the filter 212. The mounting indent 222 may be configured to receive a corresponding protrusion (not shown) on the bottom surface of the cover 202 in embodiments where it is desirable for the filter 212 to be fixed in motion with respect to the cover 202. In the shown embodiment, however, the filter 212 is rotatable relative to the cover 202, and the mounting indent 222 is not connected to the cover 202.

A pressure sensor 208 may be provided to detect the pressure within the filter assembly 110. In the shown embodiment, the pressure sensor 208 is mounted directly on the housing 200 and an air passage joins the pressure sensor 208 to the air inside the housing 200. For example, an air pressure tap 208' on the pressure sensor 208 may connect to a corresponding tap 209 that leads into the housing 200 by a flexible hose (now shown). The pressure sensor 208 alternatively may be located remotely and connected to the housing 200 by an air passage. As the filter 212 accumulates dust and dirt removed from the semi-clean air, the accumulated dirt reduces the permeability of the filter 212, and the pressure drop generated by the vacuum fan is less able to pass through the filter 212. Thus, as dirt accumulates on the filter 212, the air pressure around the filter assembly 110 increases (i.e., the negative pressure drop decreases), as compared to circumstances when the filter 212 is less clogged. Thus, the pressure sensor 208 may detect when the pressure exceeds a predetermined threshold value.

In this example, the pressure sensor 208 detects the gauge pressure (i.e., pressure in relation to atmospheric) upstream of the filter 212, but in alternative embodiments, the pressure sensor 208 may be configured to detect gauge pressure downstream of the filter 212, or it may be configured to measure differential pressure between two or more points. For example, the pressure sensor 208 may have one pressure tap located immediately upstream of the filter 212, and another pressure tap located downstream of the filter 212, to measure the pressure difference therebetween. Other alternatives will be readily apparent to persons of ordinary skill in the art in view of the present disclosure. The pressure sensor 208 may be connected to an indicator light to identify when the filter is clogged and/or an automated system to cause the filter cleaning mechanism to activate, such as explained below.

A nozzle 210 is located on the housing 200 and forms an air passage into the housing 200. The nozzle 210 fluidly connects the interior of the housing 200 to a secondary filtration system 1502 that is used to collect dirt and dust that is stopped by the filter 212, as explained in more detail below. The nozzle 210 may take any shape, but preferably comprises an elongated slit, as shown in FIGS. 2A, 2C and 3, that focuses the airflow into a concentrated area adjacent the filter 212. The nozzle 210 also may generally match the height of the filter 212, such as shown in FIG. 15, which may further facilitate cleaning of the filter 212 by directing airflow across the full span of the filter 212 as the filter 212 rotates.

The filter assembly 110 may include a filter mount 214, a filter valve 216, a toggle arm 218 and a drive assembly 220. The filter mount 214 and filter valve 216 may be provided as a pair of nested structures that are driven by the drive assembly 220 and configured to simultaneously rotate the filter 212 and to open and close the primary airflow passage leading from the downstream side of the filter 212 to the vacuum fan. Exemplary details of one such configuration are provided below.

In the shown example, a mounting recess 224 is formed on the top of the filter mount 214 and is configured to receive the bottom side of the mounting indent 222 of the filter 212. When mounted, the filter mount 214 is fixed in rotational motion with respect to the filter 212 (i.e., when the filter mount 214 rotates, the filter 212 rotates with the filter mount 214). In the this embodiment, the mounting recess 224 is formed as an internally-splined shape and the lower surface of the mounting indent 222 is formed as a complementary externally-splined shape, but other shapes that form a rotationally-locked connection may be used in other embodiments (e.g., a series of pins and holes, an elongated tab that fits into a slot, etc.). Other alternatives will be readily apparent to persons of ordinary skill in the art in view of the present disclosure.

The filter valve 216 is nested within the filter mount 214, and may include a valve recess 236 through which the mounting recess 224 of the filter mount 214 extends. The valve recess 236 has a diameter greater than the width of the mounting recess 224 such that the filter valve 216 is not fixed in motion with respect to the filter mount 214 and the filter 212 (i.e., the filter valve 216 may rotate independently from the filter 212 and the filter mount 214 as described below).

The filter valve 216 includes a cylindrical recess 227 configured to surround a cylindrical protrusion 234 on the base 204 of the filter assembly 110. The engagement of the cylindrical recess 227 with the cylindrical protrusion 234 permits rotational movement of the filter valve 216 with respect to the base 204. The cylindrical recess 227 and cylindrical protrusion 234 also may be configured to restrict vertical movement (i.e., movement along the axis of symmetry of the cylindrical protrusion 234) of the filter valve 216 with respect to the base 204. One or more seals, such as an O-ring, a felt band, or any suitable rotation seal as known in the art, may be provided between the cylindrical protrusion 234 and the cylindrical recess 227 to help prevent air from leaking into the vacuum fan without passing through the filter 212.

The filter valve 216 is engaged with the drive assembly 220, and the drive assembly 220 is positioned in the base 204 of the filter assembly 110. The operation of the drive assembly 220 is further explained below.

Figure 4A:
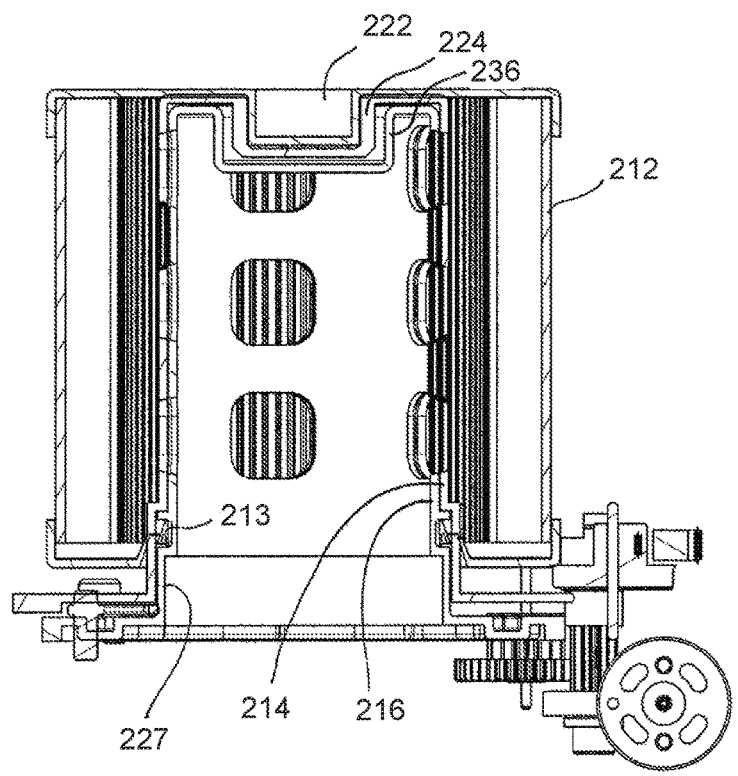
FIGS. 4A and 4B are a cross-sectional side view and a top view, respectively, of portions of a filter assembly.
Figure 4B:
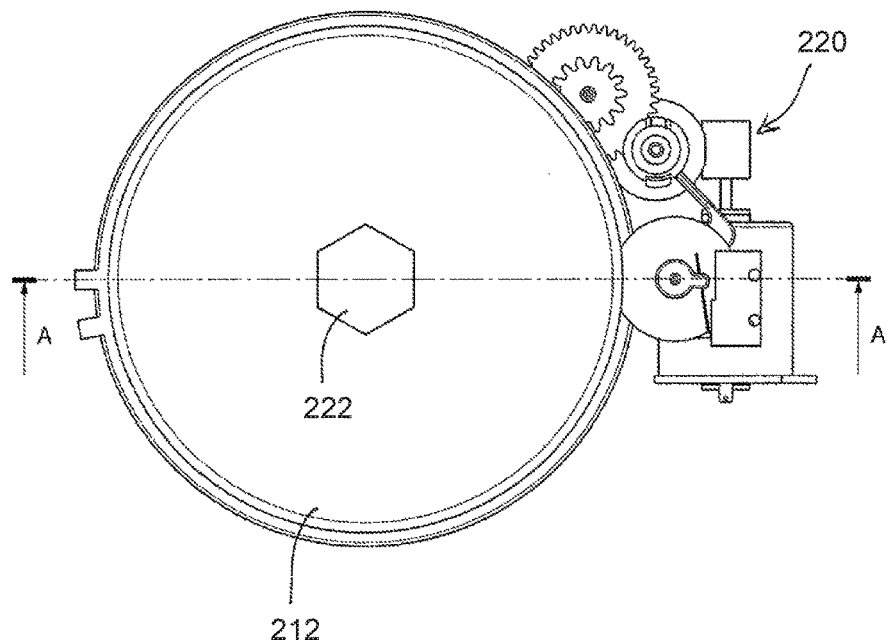

Referring to FIG. 4A, a cross-sectional view of portions of the filter assembly 110 when assembled is shown. (FIG. 4B shows the same parts as FIG. 4A, as a top plan view.) The filter 212 is generally hollow and the filter mount 214 is positioned within the filter 212. The filter valve 216 is positioned within the filter mount 214. As depicted, the mounting indent 222 on the filter 212 is received by the mounting recess 224 of the filter mount 214, and the valve recess 236 receives the mounting recess 224 with the mounting indent 222 inserted therein. The matched geometries of the mounting recess 224 and the mounting indent 222 fix rotational movement of the filter mount 214 with respect to the filter 212, while the unmatched geometries (e.g., wider diameter) of the valve recess 236 and mounting recess 224 permit rotational movement of the filter valve 216 independent of rotation of the filter mount 214 and the filter 212. A rotation seal 213, such as a lip seal (as shown), an O-ring, a felt or elastomeric band, a labyrinthine seal, or any other suitable rotation seal, may be provided between the filter mount 214 and the filter valve 216 to help prevent air from bypassing the filter 212 on the way to the vacuum fan.

Figure 6B:
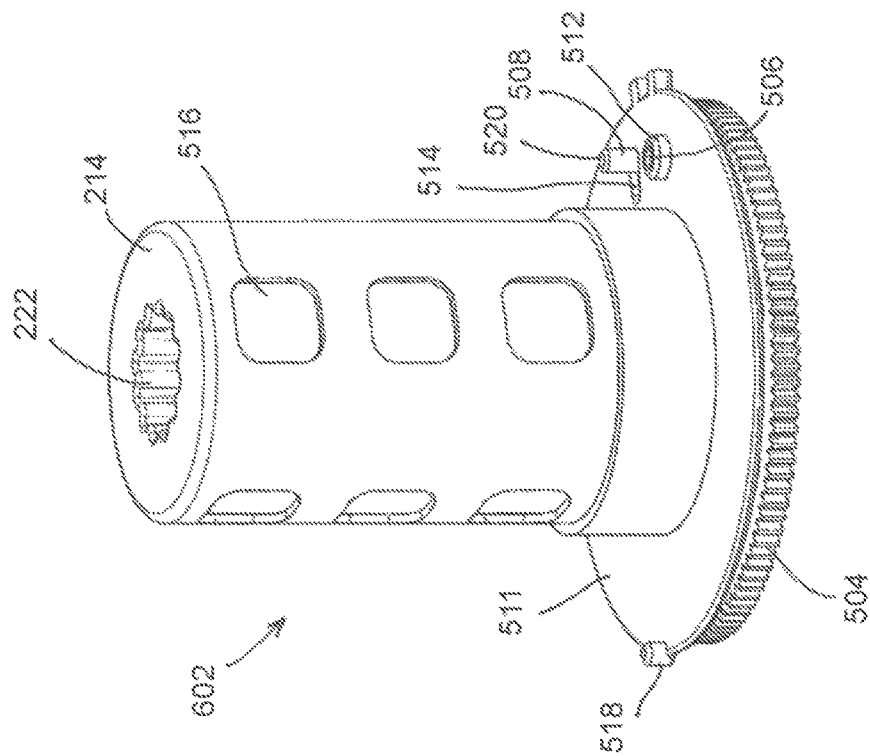
FIGS. 6A and 6B depict a filter mount, filter valve and toggle arm assembled together, and shown in the open position and closed position, respectively.

The filter mount 214, filter valve 216 and toggle arm 218 are shown and described in greater detail at FIGS. 5-6B. The filter mount 214 additionally includes one or more mount openings 516, and may include a radially-extending filter mount plate 511 having a retention aperture 512, an indexing aperture 514, and a counter rod 518. The filter valve 216 further includes a track 502, a bottom wall 503, valve teeth 504, and one or more valve openings 505. The track 503 may be provided on a radially-extending filter valve plate 501, and the valve teeth 504 may be provided at the outer perimeter of the filter valve plate 501. The toggle arm 218 includes a retaining projection 506, an indexing projection 508, and a spring 510 that may be formed as a flexible protrusion from the toggle arm body. In other embodiments, the locations of the operative parts may be reversed or reconfigured. For example, the track 502 and driven teeth 504 may be located on the filter mount 214, and the remaining parts repositioned accordingly.

Figure 6A:
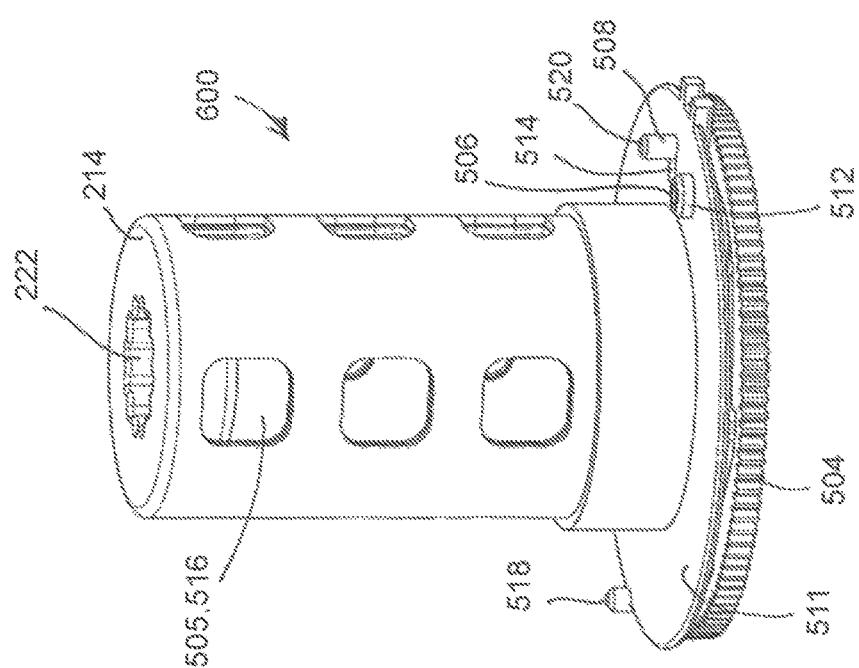

As shown, the indexing projection 508 of the toggle arm 218 includes a top portion 520 and a bottom portion 522. The bottom portion 522 extends into the track 502 of the filter valve 216, and the top portion 520 extends into the indexing aperture 514 of the filter mount 214. The retaining projection 506 of the toggle arm 218 extends into the retention aperture 512 of the filter mount 214. The extension of the retaining projection 506 through the retention aperture 512 and the top portion 520 of the indexing projection 508 through the indexing aperture 514 is shown at FIGS. 6A and 6B. It will be appreciated that the indexing aperture 514 and retention aperture 512 may be holes that pass completely through the filter mount 214, or they may be recesses into the filter mount 214.

In FIGS. 6A and 6B, the filter mount 214, toggle arm 218 and filter valve 216 are depicted assembled. The assembled filter mount 214, toggle arm 218 and filter valve 216 are shown in an open position 600 in FIG. 6A, and a closed position 602 in FIG. 6B. In the open position 600, the valve openings 505 of the filter valve 216 are aligned with the mount openings 516 of the filter mount 214. In this configuration, the downstream side of the filter 212 is in fluid communication with the vacuum fan to generate an airflow through the filter 212. In the closed position 602, the mount openings 516 are offset by about 45 degrees with respect to the valve openings 505. This blocks fluid communication between the downstream side of the filter 212 and the vacuum fan, and forms a closed space on the downstream side of the filter. This essentially stops airflow through the filter in either direction, but it will be appreciated that some nominal amount of airflow may still persist in the close position 602, as air may be able to enter the mount openings 516, traverse laterally between the adjacent walls of the filter mount 214 and the filter valve 216, and then pass through the valve openings 505. However, such airflow is greatly reduced (especially if there is an alternative path of lesser resistance for the air to take to enter the vacuum fan), and persons of ordinary skill in the art will appreciate that airflow is effectively blocked even if a nominal amount of flow continues.

In normal vacuum cleaning operation, the filter mount 214 and the filter valve 216 are in the open position 600. In this position, the semi-clean air is drawn into the filter assembly 110 along a primary flow path by suction generated by the vacuum fan. The suction pulls air through the filter 212, which removes dust and dirt from the semi-clean air. The air then enters the openings 505, 516 and exits the filter assembly 110 through the open bottom of the filter valve 216. The cleaned air then passes to the vacuum fan, either directly or by way of additional filters located in the flow path to the vacuum fan. During the normal vacuum cleaning operation, semi-clear air is continuously filtered by the filter 212, and dust and dirt accumulates on and around the filter 212.

As the dirt accumulates on the filter, the volumetric rate of air passing through the filter may decrease. This leads to overall reduced cleaning performance of the vacuum cleaner, because the vacuum fan becomes less effective at picking dirt up from the floor. Thus, as described above, the pressure sensor 208 is configured to detect the pressure at or near the filter assembly 110. When the pressure reaches a predetermined threshold level, the pressure sensor 208 transmits a signal causing the filter mount 214 and filter valve 216 to shift into the closed position 602 to enter a filter cleaning mode of operation. In the closed position 602, the filter mount 214 and filter valve 216 are positioned to prevent air from exiting the filter assembly 110 through the bottom of the filter valve 216. Instead, in the closed position 602, the airflow passes through a secondary filtration system via the nozzle 210, to remove at least some of the dust and dirt accumulated on and around the filter 212, thereby restoring (at least partially) the filter's 212 ability to effectively clean the air without too greatly impeding airflow to the vacuum fan. It will be appreciated that any desired threshold pressure level may be selected to initiate operation of the valve to the closed position. For example, such operation may be performed at relatively low pressures (i.e., when relatively little dirt has accumulated to block the airflow through the filter 212), to provide frequent maintenance. Alternatively, a relatively high pressure may be selected to clean the filter 212 only when accumulated dirt is significantly affecting the overall cleaning performance of the vacuum cleaner. It will be appreciated that the term "low pressure" as used immediately above refers to a relatively low absolute pressure value, and "high pressure" as used immediately above refers to a relatively high absolute pressure value. In the environment of the vacuum cleaner, a "low pressure" would have a relatively "high" negative value as compared to atmospheric pressure, and such a "high pressure" would have a relatively "low" negative value as compared to atmospheric pressure.

An example of a mechanism by which the filter mount 214 and the filter valve 216 move from the open position 600 to the closed position 602 is now described in detail.

As depicted in FIG. 3, a drive assembly 220 is operatively connected to the filter valve 216. An exemplary drive assembly 220 is depicted in greater detail at FIG. 7. This drive assembly 220 includes a motor 700 (e.g., a DC electric motor, a stepper motor, or the like), and a gear set 704. A counter assembly 706 also may be provided. Furthermore, a control circuit 708 may be operatively connected to the motor 700 and the counter assembly 706 and the pressure sensor 208, to control the operation of the motor 700, such as described below.

Figure 8:
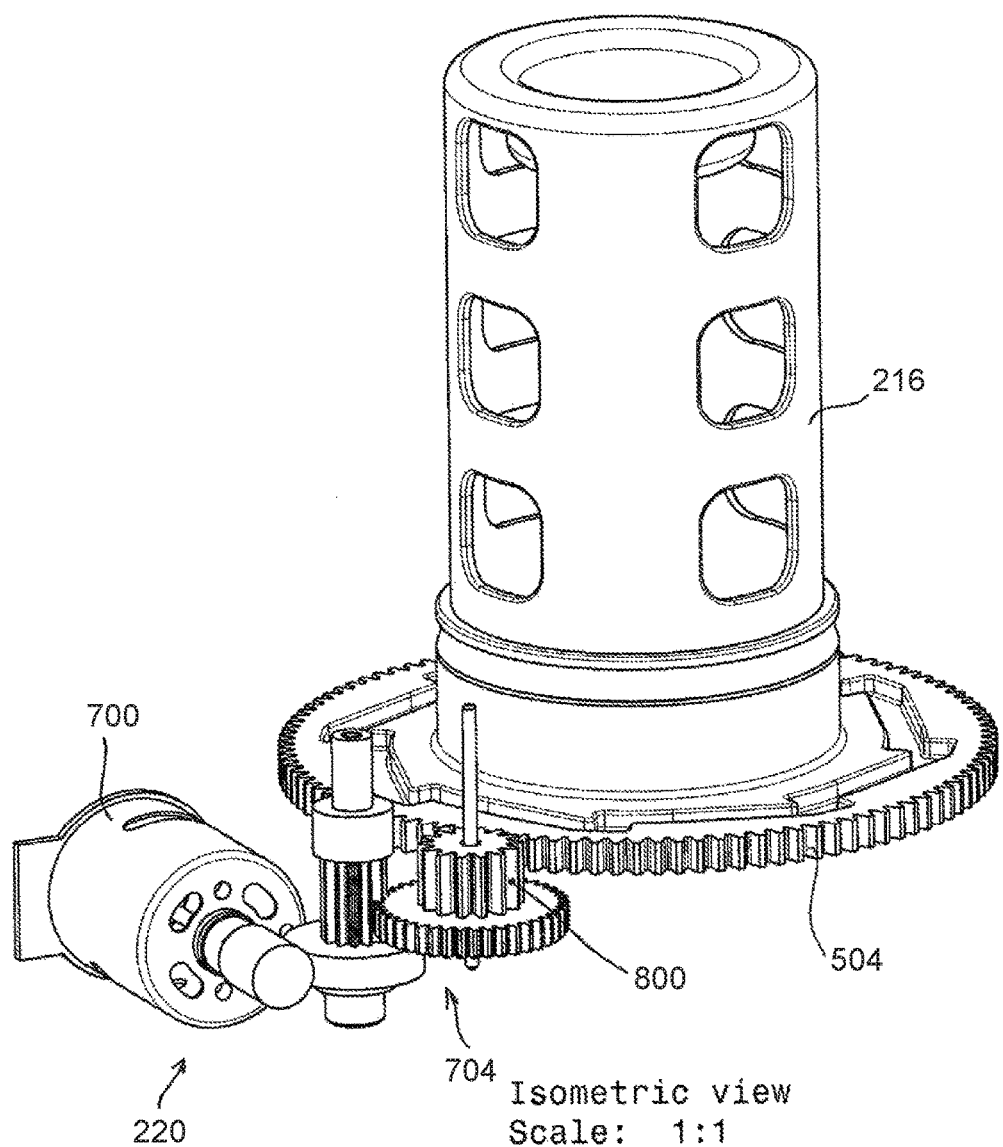
FIG. 8 depicts a gear assembly operatively connected to a filter valve.

The gear set 704 includes any suitable arrangement of gears to match the rotation speed of the motor 700 to the desired rotation speed of the filter valve 216. For example, the gear set may include a worm gear set 702 (depicted for simplicity as simple cylinders) that drives a series of spur gears 703 to provide the desired reduction ratio, as known in the art. At FIG. 8, the drive assembly 220 is depicted engaged with the filter valve 216. Specifically, final drive teeth 800 on the final spur of the gear set 704 engage the valve teeth 504 of the filter valve 216. As the gear set 704 rotates, the final drive teeth 800 drive the valve teeth 504 to rotate the filter valve 216.

In use, when the pressure within the filter assembly 110 meets the predetermined threshold level, the pressure sensor 208 sends a signal causing the motor 700 of the drive assembly 220 to activate. When activated, the motor 700 rotates the gear set 704. Any suitable motor drive control circuit 708 may be used, but it preferably is configured to terminate drive only when the filter assembly 112 is back in the open position 600, so that normal cleaning resumes when the filter 212 stops rotating. An exemplary control system for operating the motor 700 is described in more detail below.

Figure 9A:
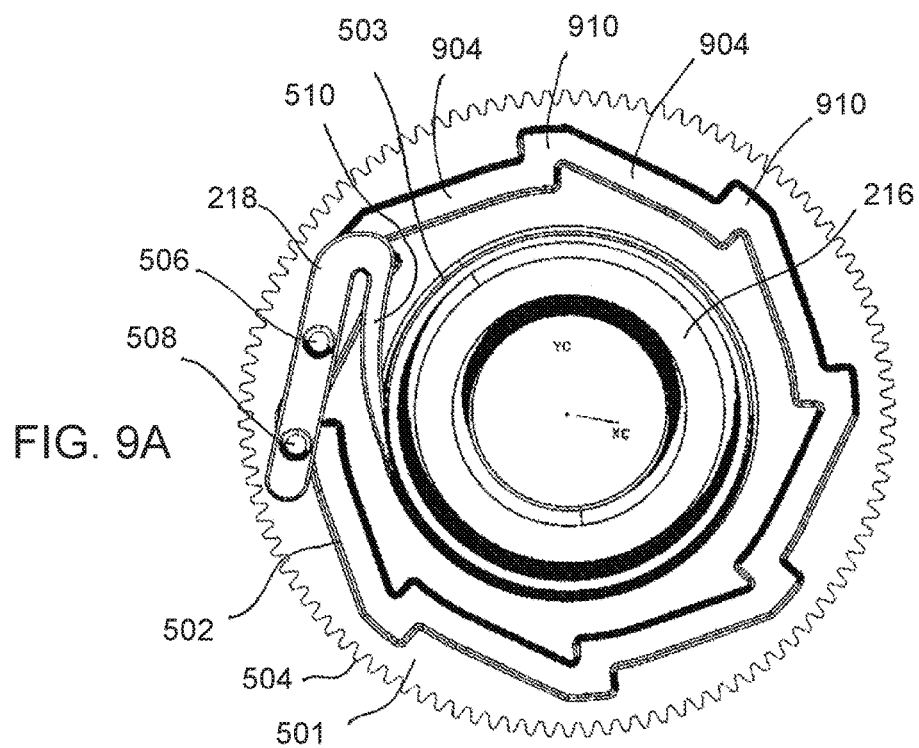
FIGS. 9A and 9B are top views of a filter valve and toggle arm, with FIG. 9B showing the toggle arm being semi-transparent.
Figure 9B:
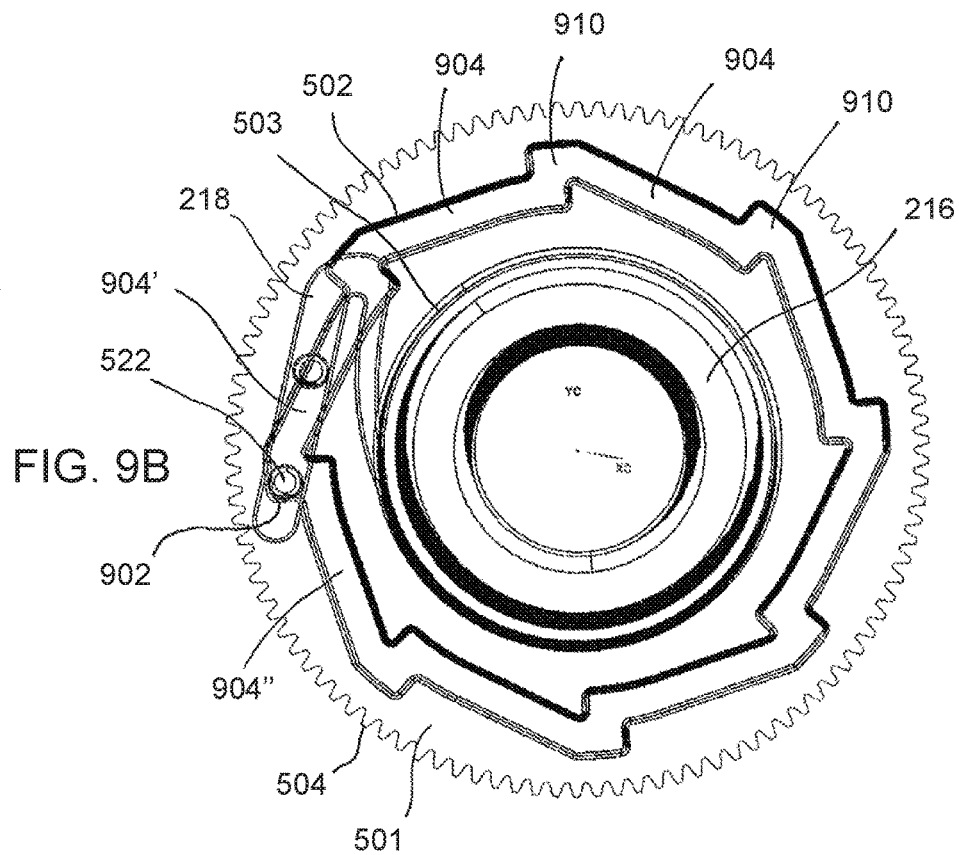

With reference to FIGS. 9A and 9B, top views of the filter valve 216 with the toggle arm 218 are shown. FIG. 9B shows the toggle arm 218 in a semi-transparent state to illustrate how the bottom portion 522 of the indexing projection 508 fits in the track 502. The track 502 is formed in a circular saw-tooth configuration, in which the track 502 is formed as ramp sections 904 that each extend at a progressively decreasing radius relative to the rotation axis 900 of the filter valve 216. Connecting sections 910 extend generally radially from the rotation axis 900 to join each adjacent pair of ramp sections 904. Each ramp section 904 and one adjacent connecting section 910 forms a "saw tooth." There are eight identical saw teeth in this example, with a 45 degree interval between corresponding points on each adjacent saw-tooth. Other track configurations and degree intervals will be understood by one of skill in the art from the description herein.

FIGS. 9A and 9B depict the toggle arm 218 in an "initial" position with respect to the track 502 of the filter valve 216 (it will be understood that essentially any position could be selected as the initial position, and this particular position is chosen for expedience in explaining the operation of the device). In the initial position the filter valve 216 and filter mount 214 are in the open position 600, such that clean air enters the openings 505, 516 and exits the filter assembly 110 through the bottom of the filter valve 216. The bottom portion 522 of the indexing projection 508 extends into the track 502 and abuts a wall 902 located at one end of a first ramp 904' of the track 502. The spring 510 of the toggle arm 218 is in contact with the bottom wall 503 of the filter valve 216, and the retaining protrusion 506 is captured in place at a fixed radius from the rotation axis 900 by being held in the retention aperture 512 on the filter mount 214. Thus, a resilient restoring force generated by the spring 510 biases the toggle arm 218 to rotate in a clockwise direction, as shown in FIGS. 9A and 9B, thereby causing the bottom portion 522 of the indexing protrusion 508 to remain against the wall 902 of the track 502 until a force is applied to move the bottom protrusion 522 out of this position. Of course, other spring arrangements may be used to bias bottom portion 522 of the indexing protrusion 508 radially outward. Also, the parts may be reconfigured to operate in essentially the reverse direction by biasing the bottom portion 522 of the indexing protrusion radially inward. Other alternatives will be readily apparent to persons of ordinary skill in the art in view of the present disclosure.

When the gear set 704 of the drive assembly 220 rotates, it causes the filter valve 216 to rotate in a clockwise direction with respect to the view of FIGS. 9A and 9B (of course, the configurations could be reversed such that the filter valve 216 is caused to rotate counterclockwise). In the initial position, the bottom portion 522 of the indexing projection 508 is retained against the wall 902 via the radially outward biasing force from the spring 510. As described at FIGS. 6A and 6B, when assembled, the retaining protrusion 506 of the toggle arm 218 extends into the retention aperture 512 and the top portion 520 of indexing protrusion 508 extends into the indexing aperture 514 of the filter mount 214. Thus, in the initial position, the toggle arm 218 is captured in place and forms a rigid link between the wall 902 and the retention aperture 512 and indexing aperture 514 (it will be appreciated that other embodiments may remove one of the indexing aperture 514 and the retention aperture 512 while still providing this rigid link configuration). Thus, when the filter valve 216 rotates, the toggle arm 218, in effect, pushes the filter mount 214 via this rigid link, causing the filter mount 214 to rotate with the filter valve 216. Furthermore, as described at FIGS. 2A-4, the geometry of the mounting recess 224 of the filter mount 214 matches the mounting indent 222 of the filter 212, which fixes rotation of the filter mount 214 with respect to the filter 212. As such, when the toggle arm 218 is in the initial position, the filter 212 also rotates with the filter mount 214, filter valve 216 and toggle arm 218.

FIGS. 10A-13B depict top views of the filter valve 216 as the filter valve 216 rotates independently from the filter mount 214, moving the filter valve 216 and filter mount 214 into the closed position 602. To better illustrate this process, the filter mount plate 511 is not shown in FIGS. 10A-13B, and in FIGS. 10B, 11B, 12B and 13B, only the bottom portion 522 of the indexing protrusion 508 of the toggle arm 218 is shown.

To provide the desired independent rotation, a valve switch projection 1000 is provided adjacent the filter assembly 110 and positioned to engage the top portion 520 of the indexing protrusion 508 for every 360 degree rotation of the filter mount 214. The valve switch projection 1000 may be formed or attached as a protrusion that extends inwardly towards the filter 212 from an inner wall of the housing 200, or otherwise provided as a structure that is contacted by the indexing protrusion 508 as the filter mount 214 rotates. The valve switch projection 1000 alternatively may be configured to engage the bottom portion of the 522 of the indexing protrusion 508, or other parts of the toggle arm 218, in which case the upper portion 520 may be removed. Other alternatives will be readily apparent to persons of ordinary skill in the art in view of the present disclosure.

During operation of the drive assembly 220 with the toggle arm 218 in the initial position, the filter valve 216, toggle arm 218, filter mount 214 and filter 212 rotate about the rotation axis 900. When the indexing protrusion 508 reaches the valve switch projection 1000, the valve switch projection 1000 engages the indexing protrusion 508. Depicted in FIGS. 11A and 11B, the engagement of the valve switch projection 1000 with the indexing protrusion 508 forces the indexing protrusion radially inward towards the rotation axis 900. (The indexing aperture 514 of the filter mount 214 is sized or shaped to allow this movement as the toggle arm 518 pivots about the retaining projection 508.) This movement pushes the bottom portion 522 radially inward and out of contact with the wall 902 of the track 502. The filter valve 216 continues to rotate as it is driven by the drive assembly 220. However, because the bottom portion 522 is no longer retained against the wall 902 of the track 502, the toggle arm 218 no longer forms a rigid link between the filter valve 216 and the filter mount 214. Thus, the toggle arm 218 longer pushes the filter mount 214, and the filter mount 214 stops rotating in unison with the filter valve 216.

Once the bottom portion 522 is displaced from the wall 902, it is positioned so that further rotation of the filter valve 216 will position the bottom portion 522 in the next ramp 904″ of the track 502. Since force is no longer applied by the wall 902 against the bottom portion 522, it may be necessary to provide some force to slightly rotate the filter mount 214 so that the top portion 520 of the indexing projection 508 moves past the valve switch projection 1000. This force may be provided by friction between the filter mount 214 and the filter valve 216. For example, a friction force between the spring 510 and the bottom wall 502 of the filter valve 216 may generate a drag force that pulls the filter mount 214 far enough to move the indexing projection 508 past the valve switch projection 1000. Such force also may be provided by contact between the next ramp 904″ and the bottom portion 522 of the indexing projection 508, or by other friction or mechanical contact.

Shown in FIGS. 12A and 12B, as the filter valve 216 continues to rotate, an end wall 906 of the next ramp 904″ approaches the bottom portion 522. At the same time, the biasing force of the spring 510 presses the bottom portion 522 radially outward, which causes the filter mount 214 to stay generally in place until the end wall 906 of the next ramp 904″ engages the bottom portion 522. Thus, in the shown example, the filter valve 216 rotates about 45 degrees after the protrusion 1000 engages the indexing projection 508, until the adjacent wall 906 contacts the bottom portion 522 of the indexing projection 508. Retention of the bottom portion 522 against the adjacent wall 906 again forms a rigid link between the filter valve 216 and the filter mount 214, which acts as to push the filter mount 214 and the filter 212 to rotate with the filter valve 216. However, since the filter valve 216 rotated 45 degrees while the filter mount 214 remained stationary, the valve openings 505 are now offset by 45 degrees with respect to the mount openings 516. Thus, the filter mount 214 and the filter valve 216 are moved to the closed position 602.

When the filter assembly 110 is in the closed position 602, air is mostly blocked from exiting the filter assembly 110 through the bottom of the filter valve 216, and instead the air flows primarily through the secondary filtration system via the nozzle 210. This removes dirt and debris from the filter 212 and the housing 200. The nozzle 210 may be positioned in close proximity to the filter 212 and may be about the same height as the filter 212, so as to focus the suction directly on the filter to obtain the most effective cleaning. Since the filter 212 will rotate approximately 360 degrees while the valve 216 and the mount 214 are in the closed position 602, the entire filter 212 will be exposed to maximum suction closest to the nozzle 210 during a full rotation, further enhancing the cleaning of the filter 212. In the shown embodiment, airflow continues to enter the suction inlet 203 through the cover 202, and little or no air will pass in reverse through the filter 212 itself, because the closed filter valve 216 creates a closed passage on the downstream side of the filter. However, some localized reverse airflow may occur at the part of the filter 212 that is immediately adjacent the nozzle 210.

After being placed in the closed position 602, the filter mount 214 and filter valve 216 rotate an additional 360 degrees until the protrusion 1000 once again engages the indexing projection 508 to allow relative movement. The filter valve 216 rotates about 45 degrees while the filter mount 214 remains essentially stationary. The valve openings 505 rotate 45 degrees with respect to the mount openings 516, thereby aligning the openings and moving the filter mount 214 and the filter valve 216 back to the open position 600.

The movement between the open position 600 and the closed position 602 may be repeated as desired, and may be coordinated or controlled by any suitable control system. For example, a logical control circuit 708 may be provided to connect power (e.g., from mains supply or a battery) to start driving the motor 700 when the pressure in the housing 200 reaches a predetermined level. The control circuit 708 also may include logic that only initiates cleaning if the pressure attains the predetermined level for a minimum amount of time or with a minimum frequency, to prevent inadvertent operation during anomalous periods when the pressure might briefly reach the predetermined level. The control circuit 708 also may include timers or control logic to prevent operation during transitional periods such as when the vacuum fan is just starting to operate or slowing to a stop.

In the shown exemplary embodiment, the control circuit 708 is configured to continue supplying power to drive the motor 700 until an interrupt signal is provided to stop driving the motor 700. This effectively decouples the drive signal from the output of the pressure sensor, which may be beneficial to ensure that the motor 700 continues to operate until the filter assembly 110 is back in the open position 600.

In the shown example, the interrupt signal is provided by the counter assembly 706. The counter assembly 706 includes a counter wheel 1400 that is coupled to an electrical switch 1402, as well as the counting rod 518 that extends from the filter mount plate 511. The underside of the counter wheel 1400 includes four grooves 1404 that are equally-spaced around the perimeter of the wheel 1400. The grooves 1404 are positioned and shaped to receive the counting rod 518, in the manner of a so-called Geneva drive. Each time the filter mount 214 rotates 360 degrees, the counting rod 518 enters one of the grooves 1404 and rotates the counter wheel 1400 90 degrees before the counting rod 518 disengages the groove 1404. Thus, the counting wheel 1400 moves 90 degrees for every 360 degree rotation of the filter mount 214. A retainer arm 1408 also may be provided to engage one of the grooves 1404 to hold the counting wheel 1400 in discrete rotational positions. In one embodiment, the retainer arm 1408 may be conveniently held in place by a journal bearing on a shaft that holds one or more reduction spur gears 703, as shown in FIG. 7. In this example, the journal bearing allows the gears to rotate freely without affecting the position of the retainer arm 1408. A torsion spring or other kind of spring or resilient structure biases the end of the retainer arm 1408 into an adjacent groove 1404, but flexes so that the retainer arm 1408 moves back to allow the counting rod 518 to periodically rotate the counting wheel 1400.

The top side of the counter wheel 1400 includes one or more radially-extending tabs 1406 that extend towards the switch 1402. The tab 1406 is positioned to activate the switch 1402 when the counter wheel 1400 is at a discrete rotational position. In this example, the tab 1406 is positioned to activate the switch 1402 when the filter assembly 112 is in the "initial" position described above with reference to FIGS. 10A-13B. In this position, the switch 1402 closes a circuit to transmit a logical control signal to the control circuit 708. The control circuit 708 is configured to turn off electric power to the motor 700 each time the switch 1402 transitions from an inactive state (open) to an active state (closed).

Figure 14B:
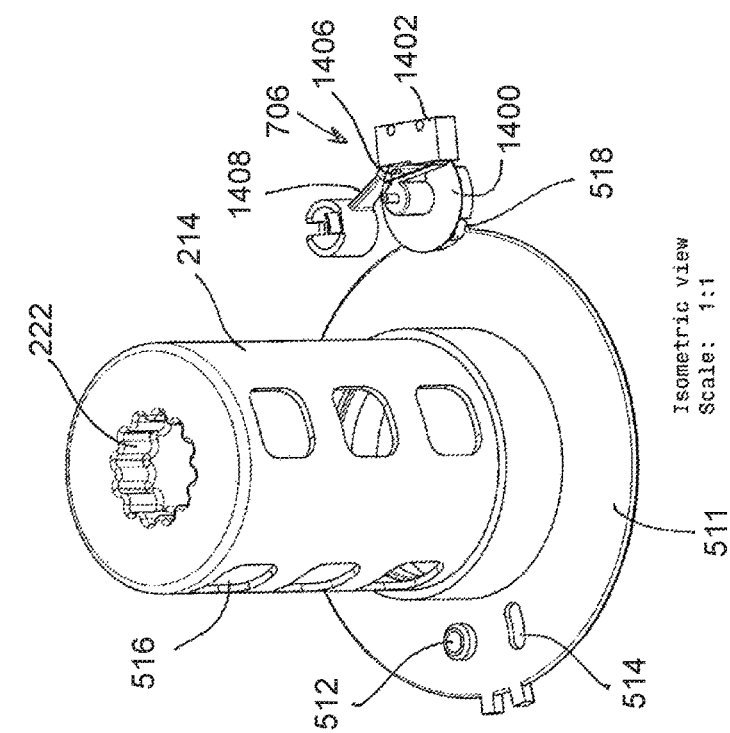
FIGS. 14A and 14B are views of a filter mount with a counter.
Figure 14A:
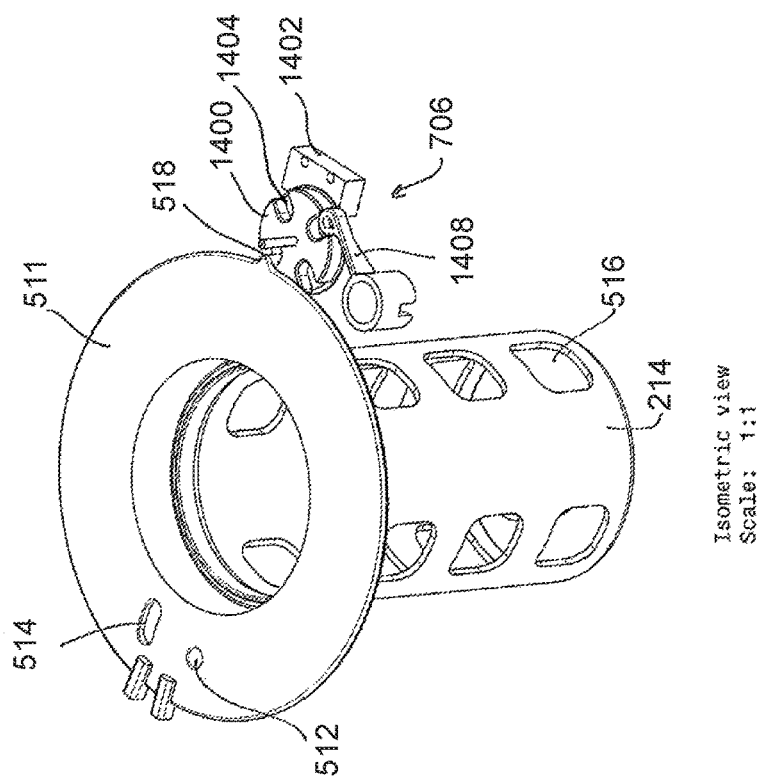

In use, the parts begin in the initial position shown in FIGS. 10A and 14B. When the pressure in the housing 200 reaches a predetermined threshold value, the pressure sensor 208 activates and sends a control signal to the control circuit 708. The control circuit 708 then begins supplying power to operate the motor 700. The motor 700 rotates the filter valve 216 through 45 degrees to initially transition from the open position 600 (FIGS. 10A-10B) to the closed position 602 (FIGS. 13A-13B). At this point, the toggle arm 218 engages the next "sawtooth" in the track 502 (see FIG. 13B), and the filter mount 214 (and filter 212) begins rotating along with the filter valve 216. Also at this time, the counting rod 518 starts moving away from counting wheel 1400 without rotating the counting wheel 1400.

The motor 700 continues driving the filter valve 216 until the filter valve 216 and filter mount 214 rotate a further 360 degrees with the parts in the closed position 602. At the end of this 360 degree rotation, the parts are back to the position shown in FIG. 10A, with the indexing projection 508 about to contact the valve switch projection 1000. Also, just before completing this 360 degree rotation, the counting rod 518 engages the counting wheel 1400, and by the completion of the 360 degree movement the counting rod 518 turns the counting wheel 1400 by 90 degrees. This returns the counting rod 518 to the position shown in FIG. 14B, in which the counting rod has just rotated the counting wheel 1400, and is about to start moving away from the counting wheel 1400. The foregoing 90 degree rotation of the counting wheel 1400 also turns the tab 1406 so that it no longer activates the switch 1402, and the switch transitions to the inactive state. At this point, the filter assembly 110 is still in the closed position 602.

In order to re-open the filter assembly 110, the control circuit 708 continues to supply power to the motor 700 to continue rotating the filter valve 216. As the filter valve 216 continues to rotate, the valve switch projection 1000 engages the indexing projection 508 to once again allow the filter valve 216 to rotate while the filter mount 214 essentially stops. After the filter valve 216 rotates 45 degrees, the mount openings 516 and valve openings 505 are once again aligned to put the parts into the open position 600. At this point, the toggle arm 218 reengages the filter mount 214 to the filter valve 216, and the parts continue to rotate together through a full 360 degrees, but this time in the open position 600. At the end of this 360-degree rotation, the counting rod 518 once again moves the counting wheel 1400 through another 90-degree turn, so that the tab 1406 faces away from the switch 1402. The foregoing process repeats two more times, with the filter closing and then opening once again, until the counting rod 518 moves the counting wheel 1400 to move the tab 406 into contact with the switch 1402. This transitions the switch 1402 from the inactive position to the active position, which sends a control signal to the control circuit 708 to turn off power to the motor 700. In this way, the counting rod 518 and counting wheel 1400 act as a position indicator to identify when the filter assembly 110 is in the open position 600, and positioned as shown in FIG.

10A, ready to recommence the cleaning cycle the next time the pressure sensor 208 indicates that cleaning should commence. During the full cycle of this embodiment, the filter valve system closes and re-opens twice during the full cleaning cycle, and the filter valve 216 rotates 1620 degrees, and the filter mount 214 and filter 212 rotate 1440 degrees.

In alternative embodiments, there may be multiple tabs 1406. For example, there may be two tabs 1406 that face in opposite directions. In this embodiment, the counting rod 518 will move one of the two tabs 1406 to close the switch 1402 once for every two turns of the filter mount 214 (as opposed to once for every four turns of the filter mount 214 in the above embodiment). Thus, in this embodiment, the filter valve system would only close and re-open once during the cleaning cycle (i.e., the filter valve 216 would rotate 810 degrees, and the filter mount 214 and filter 212 would rotate 720 degrees). Other alternatives will be readily apparent to persons of ordinary skill in the art in view of the present disclosure.

Other embodiments may use the same mechanisms but different control logic. For example, the switch 1402 may be open (instead of closed) when the tab 1406 contacts it as shown in FIG. 14B, and the control circuit 708 may be programmed to turn off electric power to the motor 700 each time the switch 1402 transitions from an active state to an inactive state. As another example, the switch 1402 may control a drive current that directly operates the motor 700, and it may be turned off whenever a tab 1406 is positioned as shown in FIG. 14B. In this embodiment, the pressure sensor 208 is connected to a control circuit 708 that generates a separate drive current to the motor 700 to activate the motor 700 just until the tab 1406 moves out of the position shown in FIG. 14B and closes the switch 1402 to take over supplying drive current to the motor 700. When the switch 1402 is once again opened, the opening switch instantly terminates power to the motor 700 without requiring a separate control signal to stop the supply of power. Other alternatives will be readily apparent to persons of ordinary skill in the art in view of the present disclosure.

A control circuit 708 as described herein can be made using basic and conventional electric circuit devices, such programmable controllers, logic gates and integrated circuits, and there is no need to explain the construction of such a control circuit 708 in detail herein. The design and implementation of a suitable control circuit are within the skill or an ordinary person of skill in the art in view of the present disclosure without undue experimentation.

While the foregoing control system is expected to provide simple automated filter cleaning, additional or alternative mechanisms for closing and opening valves, rotating the filter, and so on may be implemented in other embodiments. For example, the pressure sensor 208 may be used to prevent operation of the secondary filtration system when the pressure in the filter assembly 110 is below a predetermined level (i.e., when the pressure is at a level that indicates that the filter 212 does not require cleaning). The activation and deactivation of the secondary filtration system and rotation of the filter valve 216 also may be manually performed. For example, in a user-controlled system, the user may be provided with a switch to manually activate the motor 700 to drive the parts, or the motor 700 and drive system may be replaced by a mechanical linkage that the user operates manually to cut off airflow from the downstream side of the filter 212 to the vacuum fan and/or rotate the filter 212. It will also be appreciated that the foregoing embodiment may be replaced by other configurations that selectively stop the airflow from the filter 212 to the vacuum fan. For example, the nested filter mount 214 and filter valve 216 may be replaced by a butterfly valve, flapper valve, barrel valve, or any other suitable valve structure, which may be operated by a solenoid, a motor/gear system, or any other suitable controller whenever it is desired to stop airflow between the downstream side of the filter 212 and the vacuum fan. It is also contemplated that in other embodiments, the filter 212 may be mounted so that it does not rotate within the filter assembly 110. Still further, it will be appreciated that other triggers or activating controls can be used to initiate the filter cleaning operation, such as by using a simple timer to activate the filter cleaning operation during fixed intervals. The operation of the filter cleaning system also can be linked to a dirt detection system that detects the volume of dirt flowing through the vacuum cleaner or collected within the housing 200 or on the filter 212. The system also may be operated based on the volume of dirt being picked up at the vacuum cleaner's suction inlet, or upstream of or within the primary separation system. In still other variations, the illustrated and described counter assembly 706 may be modified, replaced or removed. For example, the motor 700 may be a stepper motor, include an optical encoder, or otherwise have an integrated position indicator, to precisely control the position of the motor 700, in which case the parts can be rotated to precise positions without external devices to monitor their locations. Other alternatives will be readily apparent to persons of ordinary skill in the art in view of the present disclosure.

Examples of a secondary filtration system for separating the dirt and dust removed from the filter 212 are now described in detail. A schematic illustration of fluid communication paths for the filter assembly 110, the vacuum fan 1500 and the secondary filtration system 1502 (shown, by way of example, as a dual phase cyclone array) is depicted in FIG. 15. During the normal cleaning mode of operation of the vacuum cleaner, when the filter assembly 110 is in the open position 600, air generally passes from a downstream side of the filter 212 to the vacuum fan 1500 by way of a primary suction path 1504. In this mode, during operation, the semi-clean air enters the housing 200, passes around and through the filter 212, and goes on to the vacuum fan 1500. In contrast, during the filter cleaning mode of operation, the filter assembly 110 is in the closed position 602, and air continues to enter the housing 200, but generally does not pass through the filter 212. Instead, the air passes through the nozzle 210, into and through the secondary filtration system 1502, and then to the vacuum fan 1500 via a secondary suction path 1506.

The secondary filtration system 1502 is configured to separate dirt and dust that is normally stopped by the filter 212. In this regard, it is well-known that vacuum cleaners are typically designed so that each successive cleaning stage is configured to separate out smaller and smaller debris. For example, the particular properties of the filter 212 may be selected to trap dirt and debris of a particular size range that is expected to be able to pass through the primary separation system (e.g., the cyclone 108 or a bag filter). The secondary filtration system 1502 also may be designed to separate out particles that bypass the primary separation system. The secondary filtration system 1502 also may be designed to separate out particles trapped by the filter 212. In order to help ensure that these particles are not ingested into the vacuum fan 1500, the secondary filtration system 1502 may have a significantly higher separation efficiency (i.e., it generally can separate more and/or smaller particles) than the filter 212. In this embodiment, the higher separation efficiency results in higher airflow resistance of the secondary filtration system 1502 than the filter 212. This higher resistance may reduce the overall cleaning effectiveness of the vacuum cleaner 10 whenever the filter assembly 112 is in the closed position 602, but at the same time it will be more effective at capturing the dirt and debris surrounding the filter 212. This tradeoff is expected to obtain more favorable overall performance during normal vacuum cleaning operations by delaying or even eliminating the need to manually replace or clean the filter 212.

Figure 16:
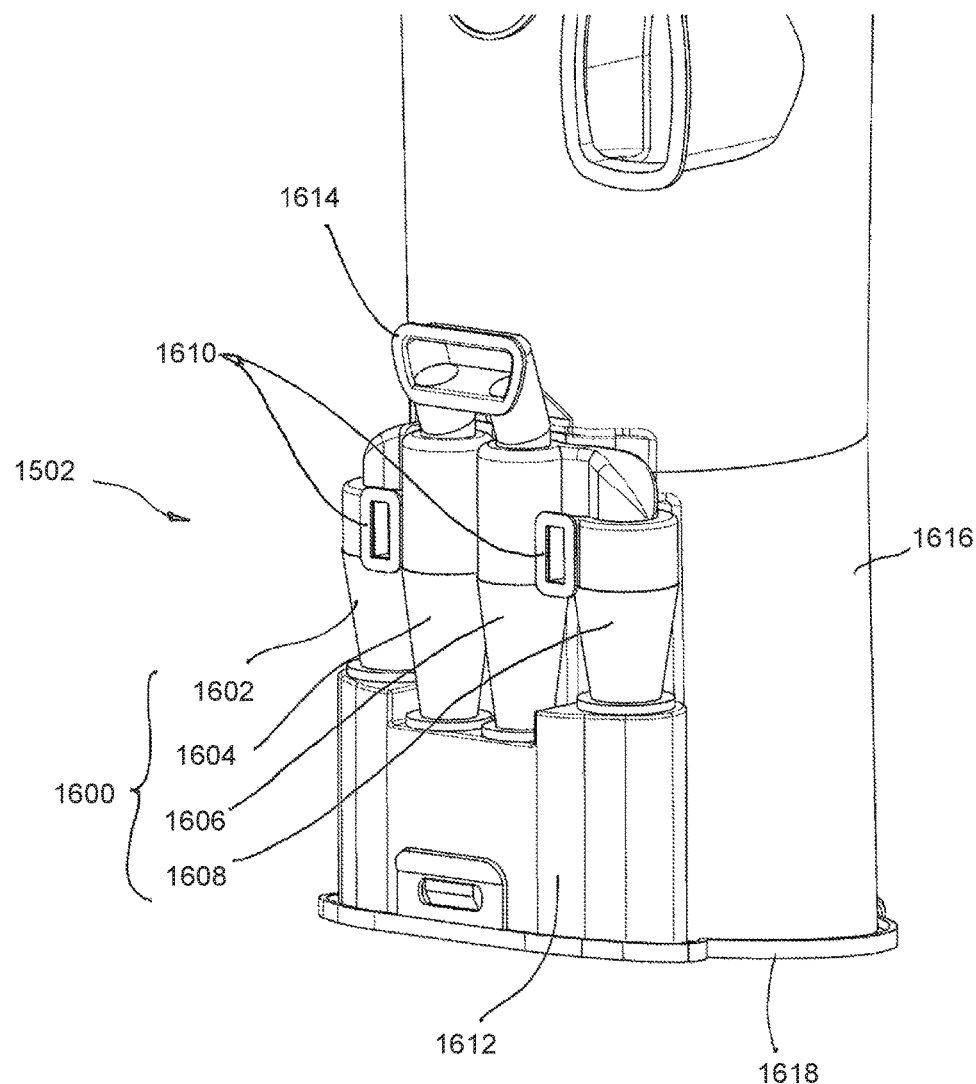
FIG. 16 depicts an example of a cyclone array used as a secondary filtration system.

One example of a secondary filtration system 1502 is shown in FIGS. 15 and 16. In this example, the secondary filtration system 1502 comprises a cyclone assembly 1600 having four cyclones 1602, 1604, 1606 and 1608. The cyclones are arranged as two parallel groups of series cyclones. Specifically, cyclones 1602 and 1604 are arranged in series as a first cyclone group, and cyclones 1606 and 1608 are arranged in series as a second cyclone group, and the two groups are arranged in parallel with each other. The assembly 1600 includes two dirty air inlets 1610 which are in fluid communication with the nozzle 210 of the filter assembly 110. Each of the cyclones removes dust and dirt from the air, and the separated dust and dirt is deposited into one or more dust chambers 1612, and preferably into an individual dust chamber 1612 for each cyclone. The assembly also includes an air outlet 1614 that conveys clean air to the vacuum fan 1500.

In operation, air passes around the filter 212, picking up dirt and debris, and proceeds into the secondary filtration system 1502. The airflow divides and passes into the two groups of series cyclones. Within each group, the air enters the first cyclone, which may be selected to have a first separation efficiency, and then enters the second cyclone, which may have a second separation efficiency that is the same as, but more preferably is higher than, the first separation efficiency. Dirt and debris is removed by both cyclones in each group, resulting in relatively clean air that passes out through the outlet 1614, through the secondary suction path 1506, and into the vacuum fan 1500.

The cyclones of the secondary filtration system 1502 may be configured in any suitable way to remove dust before it enters the vacuum fan 1500. The design and selection of appropriate cyclone arrangements (e.g., parallel, series, and combinations of the same), shapes, and sizes is well-known in the art, and need not be described here. Furthermore, the use of airflow-controlling vanes and noise-reducing vanes within cyclones is also well-known, and such features may be incorporated into embodiments. The secondary filtration system 1502 also may be replaced by other types of separator, such as conventional filters and the like. For example, the main filter 212 may comprise a high-efficiency dust filter, and the secondary filtration system may comprise a second filter of comparable construction, or, more preferably, a higher-efficiency dust filter. Other alternatives will be readily apparent to persons of ordinary skill in the art in view of the present disclosure.

As shown in FIG. 16, the dust chamber 1612 may conveniently be integrally formed with or attached to a main dust cup 1616 for a cyclonic chamber 108 that forms the primary separation system. Such a dust cup 1616 may be removable from the handle 106 to allow convenient emptying and service. In this embodiment, a single bottom door 1618 may be provided to selectively open the dust cup 1616 and dust chambers 1602 to allow dirt to fall out. The cyclones also may be mounted on the dust cup 1616, such as shown. In other embodiments, the cyclones and/or dust chambers 1612 may instead be provided separately from the cyclonic chamber 108, such as by providing them in or on the vacuum cleaner handle 106 or base 102. Other alternatives will be readily apparent to persons of ordinary skill in the art in view of the present disclosure.

Any suitable configuration of airflow passages may be used to fluidly connect the secondary filtration system 1502 between the filter 212 and the vacuum fan 1500. For example, one passage provided on the handle 106 may join the nozzle 210 to the inlets 1610, and a separate passage on the handle may join the outlets 1614 to the vacuum fan 1500. One or both passages also may be at least partially provided on a dust cup 1616 to be removable from the rest of the vacuum cleaner 10. The passages also may include cleanout doors, viewing windows, and the like, to help address occasional clogging. Other alternatives will be readily apparent to persons of ordinary skill in the art in view of the present disclosure.

It will be appreciated that the foregoing exemplary devices and systems (and variations thereof) may be operated in a variety of ways. For example, in one embodiment, a vacuum cleaner may be operated in a normal cleaning mode, in which a valve (such as one formed by the filter mount 214 and filter valve 216) is placed in an open position, and incoming air passes through the primary separation system, then through the filter 212, and then to the vacuum fan 1500. When the filter 212 becomes excessively dirty (or at periodic intervals or upon the user's command), the vacuum cleaner is operated in a filter cleaning mode. In the filter cleaning mode, a valve (such as one formed by the filter mount 214 and filter valve 216) is positioned to block airflow directly from the downstream side of the filter 212 to the vacuum fan 1500. In this mode, incoming air passes through the primary separation system, around (but generally not through) the filter 212, and through a secondary filtration system 1502. In this way, dirt that has accumulated on and around the filter 212 may be removed and collected by the secondary filtration system 1502.

An advantage of the foregoing operation method is that the vacuum cleaner can still be used for cleaning dirt off the floor or elsewhere even when it is in the filter cleaning mode, because air continues to pass into the vacuum cleaner and through the primary separation system in the normal direction (i.e., from the inlet to the outlet of the primary separation system) even during the filter cleaning mode. When the process to place the vacuum cleaner in the filter cleaning mode is automated (e.g., by activating it based on a sensed air pressure change near or across the filter 212), the vacuum cleaner can switch between the normal cleaning mode and the filter cleaning mode without user input, and without requiring the user to stop cleaning the floor or the like.

The foregoing disclosure provides a variety of new and useful devices and operation methods. It will be appreciated that these devices and methods may be used as separate components, or collectively. The foregoing embodiments also may be modified in a variety of ways. For example, if desired, a separate valve (not shown) may be provided to close airflow between the nozzle 210 and the vacuum fan 1500, to prevent any air from passing through the secondary filtration system 1502 when the vacuum cleaner is in the normal cleaning mode. Such a valve would open when the filter assembly 112 is in the closed position 602, and vice-versa. This will inhibit air from bypassing the filter 212 and going through the secondary filtration system 1502 when the vacuum cleaner is in the floor-cleaning mode. However, it is believed that such bypassing can be effectively avoided by making the secondary filtration system 1502 with a substantially higher airflow resistance than the filter 212, so that the airflow takes the path of least resistance through the filter 212 and the primary suction path 1504 unless the filter is completely or nearly completely blocked. In other embodiments, additional valves may be added to cause the air to flow in reverse through the filter 212, instead of blocking essentially all airflow through the filter as the illustrated valve 216 does. For example, one valve may be added to block airflow from the primary separation system to the filter housing 200, and another valve may be added to block the primary suction passage 1504 and open the downstream side of the filter 212 to allow ambient air to flow in reverse through the filter 212. Examples of such valve arrangements are described in the references discussed previously herein. In still other embodiments, the filter 212 may comprise the primary separation system, or a post-vacuum fan separation system. In still other alternative embodiments, the filter 212 may be operated to move linearly or along other paths, instead of rotating. For example, the filter 212 may be replaced by a conical filter. As another example, the filter 212 may be replaced by a planar filter, and the filter mount 214 and filter valve 216 may comprise planar parts that slide relative to one another. Also, in other embodiments, the filter 212 may remain stationary and/or the nozzle 210 may be movable to traverse the filter. Other alternatives will be readily apparent to persons of ordinary skill in the art in view of the present disclosure.

The embodiments described herein are all exemplary, and are not intended to limit the scope of the claimed inventions. Furthermore, terms or relative position, such as "above," "below," "top," "bottom" and the like, are used for expedience to help explain the illustrated embodiments, and are not intended to place positional requirements on the parts of the embodiments. It will be appreciated that the inventions described herein can be modified and adapted in various and equivalent ways, and all such modifications and adaptations are intended to be included in the scope of this disclosure and the appended claims.

I claim:

1. A vacuum cleaner filtration system, comprising:
    a primary separation system;
    a filter located downstream of the primary separation system, the filter having an upstream side configured to receive an airflow exiting the primary separation system, and a downstream side fluidly opposite the upstream side;
    a vacuum fan;
    a primary suction path between the downstream side of the filter and the vacuum fan;
    a valve located in the primary suction path and configured to selectively position to block the primary suction path and create a closed passage at the downstream side of the filter;
    a secondary suction path between the upstream side of the filter and the vacuum fan; and
    a secondary filtration system in the secondary suction path and configured to separate dirt from an airflow passing through the secondary suction path.

2. The vacuum cleaner filtration system of claim 1, wherein the valve comprises:
    a filter mount configured to selectively hold the filter and including one or more mount openings; and
    a filter valve positioned within the filter mount and including one or more valve openings;
    wherein the filter mount and the filter valve are configured to move between an open position in which the one or more mount openings and the one or more valve openings are aligned, and a closed position in which the one or more mount openings and the one or more valve openings are offset.

3. The vacuum cleaner filtration system of claim 2, wherein the filter mount and filter valve move to the closed position by rotation of the filter valve with respect to the filter mount.

4. The vacuum cleaner filtration system of claim 3, further comprising a motor configured to rotate the filter valve, and a linkage selectively connecting the filter mount to the filter valve to cause the filter mount to periodically rotate in unison with the filter valve.

5. The vacuum cleaner filtration system of claim 4, wherein the linkage is configured to allow the filter valve to rotate relative to the filter mount during a first movement of the filter valve to reposition the filter mount and the filter valve from the open position to the closed position.

6. The vacuum cleaner filtration system of claim 5, wherein the linkage is further configured to connect the filter mount to the filter valve to cause the filter mount to rotate in unison with the filter valve during a second movement of the filter valve, after the filter mount and filter valve have been repositioned to the closed position.

7. The vacuum cleaner filtration system of claim 6, wherein the linkage is further configured to allow the filter valve to rotate relative to the filter mount during a third movement of the filter valve to reposition the filter mount and the filter valve from the closed position to the open position.

8. The vacuum cleaner filtration system of claim 7, wherein the linkage is further configured to connect the filter mount to the filter valve to cause the filter mount to rotate in unison with the filter valve during a fourth movement of the filter valve, after the filter mount and filter valve have been repositioned to the open position.

9. The vacuum cleaner filtration system of claim 4, wherein the linkage comprises a toggle arm, and a track configured to receive an indexing projection of a toggle arm, and wherein the toggle arm is movable within the track between a first position in which the toggle arm forms a rigid linkage between the filter mount and the filter valve, and a second position in which the toggle arm does not form a rigid linkage between the filter mount and the filter valve.

10. The vacuum cleaner filtration system of claim 9, further comprising a valve switch projection positioned adjacent the valve and configured to move the toggle arm from the first position to the second position when the filter mount is located at a predetermined angular position with respect to an axis of rotation of the filter mount.

11. The vacuum cleaner filtration system of claim 1, further comprising a pressure sensor configured to selectively position the valve to block the primary suction path and create a closed passage at the downstream side of the filter when an air pressure within the vacuum cleaner filtration system reaches a predetermined threshold.

12. The vacuum cleaner filtration system of claim 1, further comprising a motor configured to rotate the filter when the valve is positioned to block the primary suction path and create a closed passage at the downstream side of the filter.

13. The vacuum cleaner filtration system of claim 12, wherein the motor is further configured to selectively move the valve to block the primary suction path and create a closed passage at the downstream side of the filter.

14. The vacuum cleaner filtration system of claim 13, further comprising:

a motor configured to rotate the filter and to move the valve between an open position in which the valve does not block the primary suction path and create a closed passage at the downstream side of the filter, and a closed position in which the valve does block the primary suction path and create a closed passage at the downstream side of the filter;

a controller configured to:
activate the motor to move the valve from the open position to the closed position, rotate the filter, move the valve from the closed position to the open position, and
deactivate the motor when the valve is returned to the open position.

15. The vacuum cleaner filtration system of claim 14, wherein the controller comprises a pressure sensor configured to activate the motor, and a position indicator configured to deactivate the motor.

16. The vacuum cleaner filtration system of claim 1, wherein the secondary suction path comprises a nozzle positioned in proximity to the filter.

17. The vacuum cleaner filtration system of claim 1, wherein the secondary filtration system comprises one or more cyclone separators.

18. The vacuum cleaner filtration system of claim 17, wherein the primary separation system comprises a primary cyclonic chamber having a main dust cup, and the one or more cyclone separators comprise one or more dust chambers, and the dust chamber is connected to the main dust cup.

19. The vacuum cleaner filtration system of claim 18, wherein the dust cup comprises a bottom door that is removable to simultaneously empty the main dust cup and the one or more dust chambers.

20. The vacuum cleaner filtration system of claim 17, wherein the secondary filtration system comprises a first group of cyclone separators arranged in series with one another, and a second group of cyclone separators arranged in series with one another, and the first group and the second group are arranged in parallel with each other.

21. The vacuum cleaner filtration system of claim 1, wherein the secondary filtration system has a higher airflow resistance than the filter, so that when the valve is not positioned to block the primary suction path and create a closed passage at the downstream side of the filter, air passing through the vacuum cleaner filtration system generally passes through the filter and into the primary suction path and bypasses the secondary suction path and secondary filtration system.

22. A process for cleaning a vacuum cleaner filter, the process comprising:
activating a vacuum fan to generate an airflow;
operating in a first mode of operation comprising:
directing the airflow through a primary separation system to partially clean the airflow,
then directing the airflow through a filter from an upstream side of the filter to a downstream side of the filter, and
then directing the airflow through a first passage to the vacuum fan to thereby capture dirt on the filter; and
operating in a second mode of operation comprising:
blocking the first passage,
directing the airflow through the primary separation system to partially clean the airflow,
then directing the airflow past the upstream side of the filter, and
then directing the airflow through a secondary separation system to thereby remove at least some of the dirt from the filter and capture at least some of the dirt from the filter in the secondary separation system.

23. The process of claim 22, wherein blocking the first passage comprises closing a valve located between the downstream side of the filter and the vacuum fan.

24. The process of claim 23, wherein closing the valve comprises rotating the filter relative to a filter mount.

25. The process of claim 22, wherein in the second mode of operation directing the airflow past the upstream side of the filter and then through the secondary separation system comprises moving the filter to expose the entire upstream side of the filter to a second passage leading to the secondary separation system.

26. The process of claim 25, wherein moving the filter comprises rotating the filter.

27. The process of claim 25, wherein the second passage comprises a nozzle extending adjacent the full extent of one dimension of the filter.

28. The process of claim 22, further comprising starting in the first mode of operation, detecting an air pressure adjacent the filter, and transitioning to the second mode of operation when the air pressure reaches a first predetermined threshold value.

29. The process of claim 28, further comprising operating in the second mode of operation and transitioning back to the first mode of operation when the air pressure reaches second predetermined threshold value.

30. The process of claim 28, further comprising operating in the second mode of operation and moving the filter to expose the upstream side of the filter to a second passage leading to the secondary separation system, and transitioning back to the first mode of operation when the entire upstream side of the filter has been exposed to the second passage.

31. The process of claim 30, wherein moving the filter comprises rotating the filter.

32. The process of claim 22, further comprising operating in the second mode of operation and moving the filter to expose the upstream side of the filter to a second passage leading to the secondary separation system, and transitioning to the first mode of operation when the entire upstream side of the filter has been exposed to the second passage.

33. The process of claim 32, further comprising operating in the first mode of operation and transitioning to the second mode of operation upon a condition selected from the group consisting of: receiving an operator command, detecting when an air pressure reaches a predetermined threshold value, reaching an predetermined elapsed time.

* * * * *